United States Patent
Kopp et al.

(10) Patent No.: US 9,651,125 B2
(45) Date of Patent: May 16, 2017

(54) ROTARY ACTUATOR

(71) Applicant: Moog Inc., East Aurora, NY (US)

(72) Inventors: John Kopp, West Seneca, NY (US); Matthew Schleife, East Aurora, NY (US)

(73) Assignee: Moog Inc., East Aurora, NY (US)

( * ) Notice: Subject to any disclaimer, the term of this patent is extended or adjusted under 35 U.S.C. 154(b) by 153 days.

(21) Appl. No.: 14/736,793

(22) Filed: Jun. 11, 2015

(65) Prior Publication Data
US 2015/0276028 A1  Oct. 1, 2015

Related U.S. Application Data

(62) Division of application No. 13/844,749, filed on Mar. 15, 2013, now Pat. No. 9,086,125.

(51) Int. Cl.
| | |
|---|---|
| *B64C 13/00* | (2006.01) |
| *F16H 21/12* | (2006.01) |
| *F16H 21/44* | (2006.01) |
| *B64C 13/42* | (2006.01) |

(52) U.S. Cl.
CPC ............. *F16H 21/12* (2013.01); *B64C 13/42* (2013.01); *F16H 21/44* (2013.01); *Y10T 74/184* (2015.01); *Y10T 74/1836* (2015.01)

(58) Field of Classification Search
CPC ......... F16H 21/44; B64C 13/42; B64C 13/00; Y10T 74/184
See application file for complete search history.

(56) References Cited

U.S. PATENT DOCUMENTS

| | | | | | |
|---|---|---|---|---|---|
| 2,695,145 | A | * | 11/1954 | Lear ..................... | B64C 13/24 244/223 |
| 3,612,106 | A | * | 10/1971 | Camboulives ........ | F02K 1/1223 138/45 |
| 4,531,448 | A | * | 7/1985 | Barnes ................... | F15B 18/00 91/384 |
| 5,701,801 | A | * | 12/1997 | Boehringer ........... | F15B 20/00 92/166 |
| 5,806,806 | A | * | 9/1998 | Boehringer .......... | G05D 1/0077 244/196 |
| 2007/0018040 | A1 | * | 1/2007 | Wingett ................. | B64C 13/42 244/99.4 |
| 2015/0081102 | A1 | * | 3/2015 | Kopp .................... | B64C 13/30 700/275 |

* cited by examiner

Primary Examiner — Valentina Xavier
(74) Attorney, Agent, or Firm — Rowland Richards, Esq.; Harter Secrest & Emery LLP

(57) ABSTRACT

An actuator system having a controlled element configured for rotary movement about a first axis relative to a reference structure; a linkage system between the element and reference structure; a first actuator and a second actuator configured to power a first degree of freedom and an independent second degree of freedom of the linkage system, respectively; the linkage system having a first link configured for rotary movement about a second axis not coincident to the first axis and second link configured for rotary movement about a third axis; the linkage system configured such that a first angle of rotation may be driven independently of a second angle of rotation between said first link and said reference structure; wherein one of the first or second actuators is configured and arranged to drive rotation of the element about the first axis when the other is operatively locked.

2 Claims, 14 Drawing Sheets

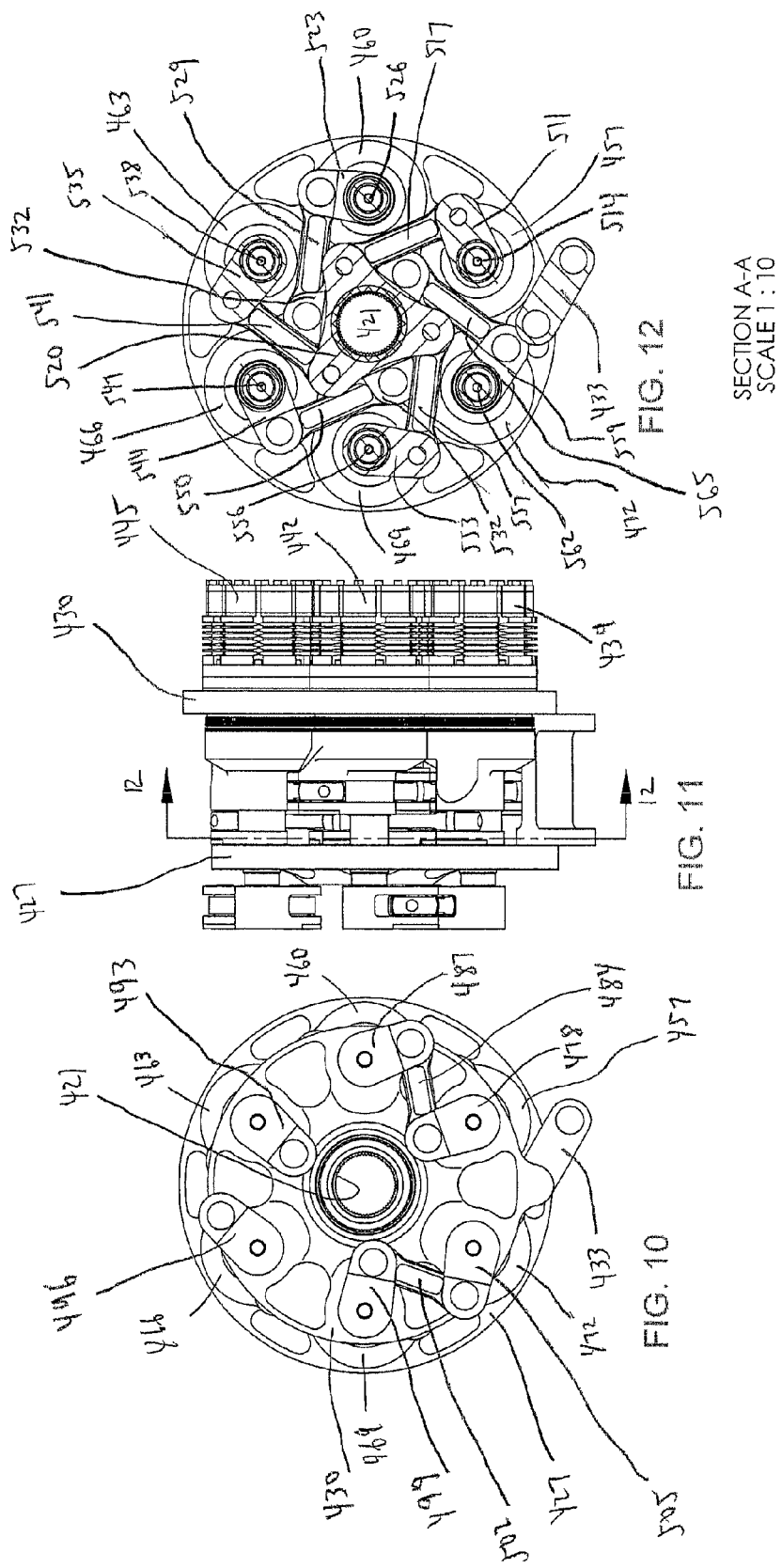

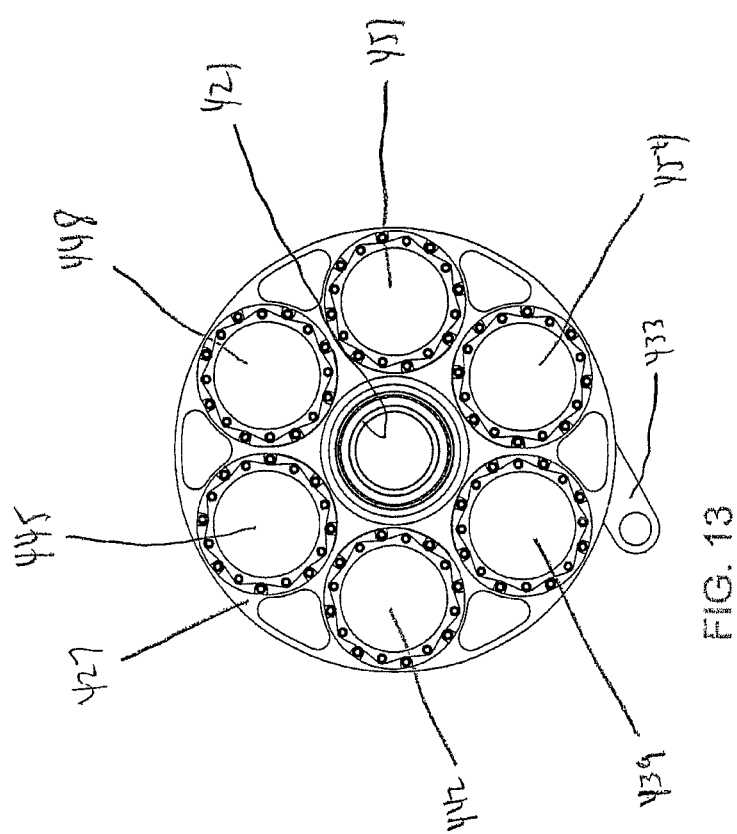

ROTARY ACTUATOR

TECHNICAL FIELD

The present invention relates generally to the field of actuator systems, and more particularly to an electromechanical redundant actuator.

BACKGROUND ART

Redundant actuator systems are generally known. These systems typically arrange multiple actuators in a way in which their displacement is summed, or their torque is summed.

BRIEF SUMMARY OF THE INVENTION

With parenthetical reference to the corresponding parts, portions or surfaces of the disclosed embodiment, merely for the purposes of illustration and not by way of limitation, the present invention provides an actuator system (100, 200) comprising: a controlled element (180, 280) configured for rotary movement about a first axis (105, 203) relative to a reference structure (110, 210); a linkage system (170, 270) connected to the element and the reference structure; a first actuator (120, 220) configured and arranged to power a first degree of freedom of the linkage system (123 relative to 122, 223 relative to 222); a second actuator (140, 240) configured and arranged to power a second degree of freedom of the linkage system (143 relative to 142, 243 relative to 242), the first degree of freedom and the second degree of freedom being independent degrees of freedom; the linkage system having a first link (123, 223) configured for rotary movement about a second axis (104, 204) relative to the reference structure; the first axis and the second axis not being coincident; the linkage system having a second link (143, 243) configured for rotary movement about a third axis (105, 205) relative to the reference structure; the first link and the second link coupled (160, 260) such that rotation of the first link about the second axis in a first direction (126, 146, 226, 246) causes rotation of the second link about the third axis in a second direction (126, 146, 226, 246); the linkage system configured and arranged such that a first angle of rotation (144, 244) between the element and the reference structure may be driven independently of a second angle of rotation (125, 225) between the first link and the reference structure; wherein one of the first or second actuators is configured and arranged to drive rotation of the element about the first axis when the other of the first or second actuator is operatively locked The first axis (105, 203) and the second axis (104, 204) may be substantially parallel and operatively offset a substantially constant distance. The first axis (203), the second axis (204) and the third axis (205) may be substantially parallel and operatively offset a substantially constant distance. The third axis may be substantially coincident with the second axis (104). The first link and the second link may be coupled with a coupling comprising a connecting link (160) having a first pivot (160b) and a second pivot (160c). The coupling may comprise a bar link (160a) between the first pivot and the second pivot. The first link and the second link may be coupled with a coupling comprising meshed gears. The first link and the second link may be coupled (160, 260) such that the first direction of rotation (126, 226) of the first link is opposite to the second direction of rotation (146, 246) of the second link. The first link and the second link may be coupled (260') such that the first direction of rotation (226') of the first link is the same as the second direction of rotation (226') of the second link. The actuator system may further comprise: a third actuator (320) configured and arranged to power a third degree of freedom of the linkage system (323 relative to 322); a fourth actuator (340) configured and arranged to power a fourth degree of freedom of the linkage system (343 relative to 342), the third degree of freedom and the fourth degree of freedom being independent degrees of freedom; the linkage system having a third link (323) configured for rotary movement about a fourth axis (304) relative to the reference structure; the linkage system having a fourth link (343) configured for rotary movement about a fifth axis (305) relative to the reference structure; the fourth axis and the fifth axis not being coincident with each other or with the first axis or the second axis; the third link and the fourth link coupled (360) such that rotation of the third link about the fourth axis in a first direction causes rotation of the fourth link about the fifth axis in a second direction; wherein one of the third or fourth actuators is configured and arranged to drive rotation of the element about the first axis when the other of the third or fourth actuator is operatively locked. The first, second, third or fourth actuators may be configured and arranged to drive rotation of the element about the first axis when the others of the first, second, third and fourth actuators have failed open. The third link and the fourth link may be coupled (360) such that the first direction of rotation of the third link is opposite to the second direction of rotation of the fourth link. The third link and the fourth link may be coupled (260') such that the first direction of rotation of the third link is the same as the second direction of rotation of the fourth link. Each of the actuators may be supported by a bearing (436). The first actuator may comprise a planetary gear stage (600). The linkage system may comprise at least five links. The linkage system may comprise a plurality of pivot joints between the links. The first actuator may comprise a rotary actuator. The first actuator may comprise a rotary motor, a hydraulic actuator, or an electric motor. The first link may comprise a stator and the second link may comprise a stator. Each of the actuators may comprise a brake. The actuator system may further comprise a brake (603) configured and arranged to hold one of the degrees of freedom of the linkage system constant. The actuator system may further comprise a spring (604) configured and arranged to bias one of the degrees of freedom of the linkage system. The spring may be selected from a group consisting of a torsional spring, a linear spring, and a flexure. The actuator system may further comprise a damper (605) configured and arranged to dampen rotation of at least one link in the linkage system. The damper may be selected from a group consisting of a linear damper and a rotary damper. The first actuator and the second actuator may comprise a stepper motor or a permanent magnet motor. The first actuator and the second actuator may comprise a magnetic clutch (607). The element may be selected from a group consisting of a shaft and an aircraft control surface. The element may be selected from a group consisting of a wing spoiler, a flap, a flaperon and an aileron. The reference structure may be selected from a group consisting of an actuator frame, an actuator housing and an airframe.

In another aspect, an actuator system (100', 200') is provided comprising: a controlled element (180, 280) configured for rotary movement about a first axis (105, 203) relative to a reference structure (110, 210); a linkage system (170, 270) connected to the element and the reference structure; a first actuator (120, 220) configured and arranged to power a first degree of freedom of the linkage system (123 relative to 122, 223 relative to 222); a hold device (140', 240') configured and arranged to selectively lock a second degree of freedom of the linkage system (143' relative to 142', 243' relative to 242'), the first degree of freedom and the second degree of freedom being independent degrees of freedom; the linkage system having a first link (123, 223) configured for rotary movement about a second axis (104, 204) relative to the reference structure; the first axis and the second axis not being coincident; the linkage system having a second link (143', 243') configured for rotary movement about a third axis (105, 205) relative to the reference structure; the first link and the second link coupled (160, 260) such that rotation of the first link about the second axis in a first direction (126, 146, 226, 246) causes rotation of the second link about the third axis in a second direction (126, 146, 226, 246); the linkage system configured and arranged such that a first angle of rotation (144, 244) between the element and the reference structure may be driven independently of a second angle of rotation (125, 225) between the first link and the reference structure; wherein the hold device is configured and arranged to lock the second degree of freedom when the first actuator is operational and to unlock the second degree of freedom when the first actuator is operatively locked.

The first axis (105, 203) and the second axis (104, 204) may be substantially parallel and operatively offset a substantially constant distance. The first axis (203), the second axis (204) and the third axis (205) may be substantially parallel and operatively offset a substantially constant distance. The third axis may be substantially coincident with the second axis (104). The first link and the second link may be coupled (160, 260) such that the first direction of rotation (126, 226) of the first link is opposite to the second direction of rotation (146, 246) of the second link. The first link and the second link may be coupled (260') such that the first direction of rotation (226') of the first link is the same as the second direction of rotation (226') of the second link. The actuator system may further comprising: a second actuator (320) configured and arranged to power a third degree of freedom of the linkage system (323 relative to 322); a second hold device (340') configured and arranged to selectively lock a fourth degree of freedom of the linkage system (343' relative to 342'), the third degree of freedom and the fourth degree of freedom being independent degrees of freedom; the linkage system having a third link (323) configured for rotary movement about a fourth axis (304) relative to the reference structure; the linkage system having a fourth link (343') configured for rotary movement about a fifth axis (305) relative to the reference structure; the fourth axis and the fifth axis not being coincident with each other or with the first axis or the second axis; the third link and the fourth link coupled (360) such that rotation of the third link about the fourth axis in a first direction causes rotation of the fourth link about the fifth axis in a second direction; wherein the second hold device is configured and arranged to lock the fourth degree of freedom when the second actuator is operational and to unlock the fourth degree of freedom when the second actuator is operatively locked. The first actuator may comprise a rotary actuator. The first link may comprise a stator. The element may be selected from a group consisting of a shaft and an aircraft control surface. The reference structure may be selected from a group consisting of an actuator frame, an actuator housing and an airframe.

In another aspect, an actuator system (100, 200) is provided comprising: a controlled element (180, 280) configured for rotary movement about a first axis (105, 203) relative to a reference structure (110, 210); a plurality of actuator units, each of the actuator units comprising: a linkage system (170, 270) connected to the element and the reference structure; a first actuator (120, 220) configured and arranged to power a first degree of freedom of the linkage system (123 relative to 122, 223 relative to 222); a second actuator (140, 240) configured and arranged to power a second degree of freedom of the linkage system (143 relative to 142, 243 relative to 242), the first degree of freedom and the second degree of freedom being independent degrees of freedom; the linkage system having a first link (123, 223) configured for rotary movement about a second axis (104, 204) relative to the reference structure; the first axis and the second axis not being coincident; the linkage system having a second link (143, 243) configured for rotary movement about a third axis (105, 205) relative to the reference structure; the first link and the second link coupled (160, 260) such that rotation of the first link about the second axis in a first direction (126, 146, 226, 246) causes rotation of the second link about the third axis in a second direction (126, 146, 226, 246); the linkage system configured and arranged such that a first angle of rotation (144, 244) between the element and the reference structure may be driven independently of a second angle of rotation (125, 225) between the first link and the reference structure; wherein one of the first or second actuators is configured and arranged to drive rotation of the element about the first axis when the other of the first or second actuator is operatively locked.

In another aspect, an actuator system (100, 200) is provided comprising: a controlled element (180, 280) configured for rotary movement about a first axis (105, 203) relative to a reference structure (110, 210); a plurality of actuator units, each of the actuator units comprising: a first actuator (120, 220) configured and arranged to power a first degree of freedom of the linkage system (123 relative to 122, 223 relative to 222); a hold device (140', 240') configured and arranged to selectively lock a second degree of freedom of the linkage system (143' relative to 142', 243' relative to 242'), the first degree of freedom and the second degree of freedom being independent degrees of freedom; the linkage system having a first link (123, 223) configured for rotary movement about a second axis (104, 204) relative to the reference structure; the first axis and the second axis not being coincident; the linkage system having a second link (143', 243') configured for rotary movement about a third axis (105, 205) relative to the reference structure; the first link and the second link coupled (160, 260) such that rotation of the first link about the second axis in a first direction (126, 146, 226, 246) causes rotation of the second link about the third axis in a second direction (126, 146, 226, 246); the linkage system configured and arranged such that a first angle of rotation (144, 244) between the element and the reference structure may be driven independently of a second angle of rotation (125, 225) between the first link and the reference structure; wherein the hold device is configured and arranged to lock the second degree of freedom when the first actuator is operational and to unlock the second degree of freedom when the first actuator is operatively locked.

In another aspect, an actuator system is provided comprising: a reference structure; an output member rotatably coupled to the reference structure for rotation about a first axis; a first actuator having a first member and a second member, the second member configured to rotate relative to the reference structure, the first member configured to rotate relative to the reference structure about a second axis, the first member configured to rotate relative to the reference structure independent of the rotation of the second member relative to the reference structure; a second actuator having a first member and a second member, the second member configured to rotate relative to the reference structure, the first member configured to rotate relative to the reference structure about a third axis, the first member configured to rotate relative to the reference structure independent of the rotation of the second member relative to the reference structure; a first link pivotally connected between the first member of the first actuator and the first member of the second actuator, the first member of the first actuator and the first member of the second actuator coupled such that rotation of the first member of the first actuator in a first direction causes rotation of the first member of the second actuator in a second direction; a second link pivotally connected between the second member of the first actuator and the output member.

The actuator system may further comprise a third link pivotally connected between the second member of the second actuator and the output member. The first direction and the second direction may be the same. The first direction and the second direction may be opposite. The first axis and the third axis may be coincident. The first member may be a stator. The second member may be a rotor.

In another aspect, an actuator system is provided comprising: a reference structure; an output member rotatably coupled to the reference structure for rotation about a first axis; a first actuator having a first member and a second member, the second member configured to rotate relative to the reference structure, the first member configured to rotate relative to the reference structure about a second axis, the first member configured to rotate relative to the reference structure independent of the rotation of the second member relative to the reference structure; a holding device having a first member and a second member, the second member configured to rotate relative to the reference structure, the holding device configured to alternate between a first configuration where the rotational position of the first member relative to the second member is locked and a second position where the first and second members are free to rotate relative to each other; a first link pivotally connected between the first member of the first actuator and the first member of the holding device, the first member of the first actuator and the first member of the holding device coupled such that rotation of the first member of the first actuator in a first direction causes rotation of the first member of the holding device in a second direction; a second link pivotally connected between the second member of the first actuator and the output member; wherein the holding device moves from the first configuration to the second configuration when the first actuator is operatively locked.

The actuator system may further comprise a third link pivotally connected between the second member of the holding device and the output member. The holding device may be a magnetic clutch. The first direction and the second direction may be the same. The first direction and the second direction may be opposite. The first axis and the third axis may be coincident. The first member may be a stator. The second member may be a rotor.

In another aspect, a method of controlling an actuator system is provided comprising the steps of: providing an actuator system comprising: a controlled element configured for rotary movement about a first axis relative to a reference structure; a linkage system connected to the element and the reference structure; a first actuator configured and arranged to power a first degree of freedom of the linkage system; a second actuator configured and arranged to power a second degree of freedom of the linkage system, the first degree of freedom and the second degree of freedom being independent degrees of freedom; the linkage system having a first link configured for rotary movement about a second axis relative to the reference structure; the first axis and the second axis not being coincident; the linkage system having a second link configured for rotary movement about a third axis relative to the reference structure; the first link and the second link coupled such that rotation of the first link about the second axis in a first direction causes rotation of the second link about the third axis in a second direction; the linkage system configured and arranged such that a first angle of rotation between the element and the reference structure may be driven independently of a second angle of rotation between the first link and the reference structure; wherein one of the first or second actuators is configured and arranged to drive rotation of the element about the first axis when the other of the first or second actuator is operatively locked; and providing power to the first actuator and the second actuator simultaneously such that the controlled element is rotated about the second axis and an angular position of the first link is held constant about the first axis.

In another aspect, a method of controlling an actuator system is provided comprising the steps of: providing an actuator system comprising: a controlled element configured for rotary movement about a first axis relative to a reference structure; a linkage system connected to the element and the reference structure; a first actuator configured and arranged to power a first degree of freedom of the linkage system; a hold device configured and arranged to selectively lock a second degree of freedom of the linkage system, the first degree of freedom and the second degree of freedom being independent degrees of freedom; the linkage system having a first link configured for rotary movement about a second axis relative to the reference structure; the first axis and the second axis not being coincident; the linkage system having a second link configured for rotary movement about a third axis relative to the reference structure; the first link and the second link coupled such that rotation of the first link about the second axis in a first direction causes rotation of the second link about the third axis in a second direction; the linkage system configured and arranged such that a first angle of rotation between the element and the reference structure may be driven independently of a second angle of rotation between the first link and the reference structure; wherein the hold device is configured and arranged to lock the second degree of freedom when the first actuator is operational and to unlock the second degree of freedom when the first actuator is operatively locked; and providing power to the first actuator and the hold device simultaneously such that the hold device link locks the second degree of freedom of the linkage system, and the first actuator applies a desired torque to the controlled element

BRIEF DESCRIPTION OF THE DRAWINGS

FIG. 10 is a front elevational view of the fourth actuator system.

FIG. 11 is a side elevational view of the fourth actuator system.

FIG. 12 is a sectional view taken along lines 12-12 of FIG. 11.

FIG. 13 is a rear elevational view of the fourth actuator system.

DESCRIPTION OF THE PREFERRED EMBODIMENTS

Figure 1:
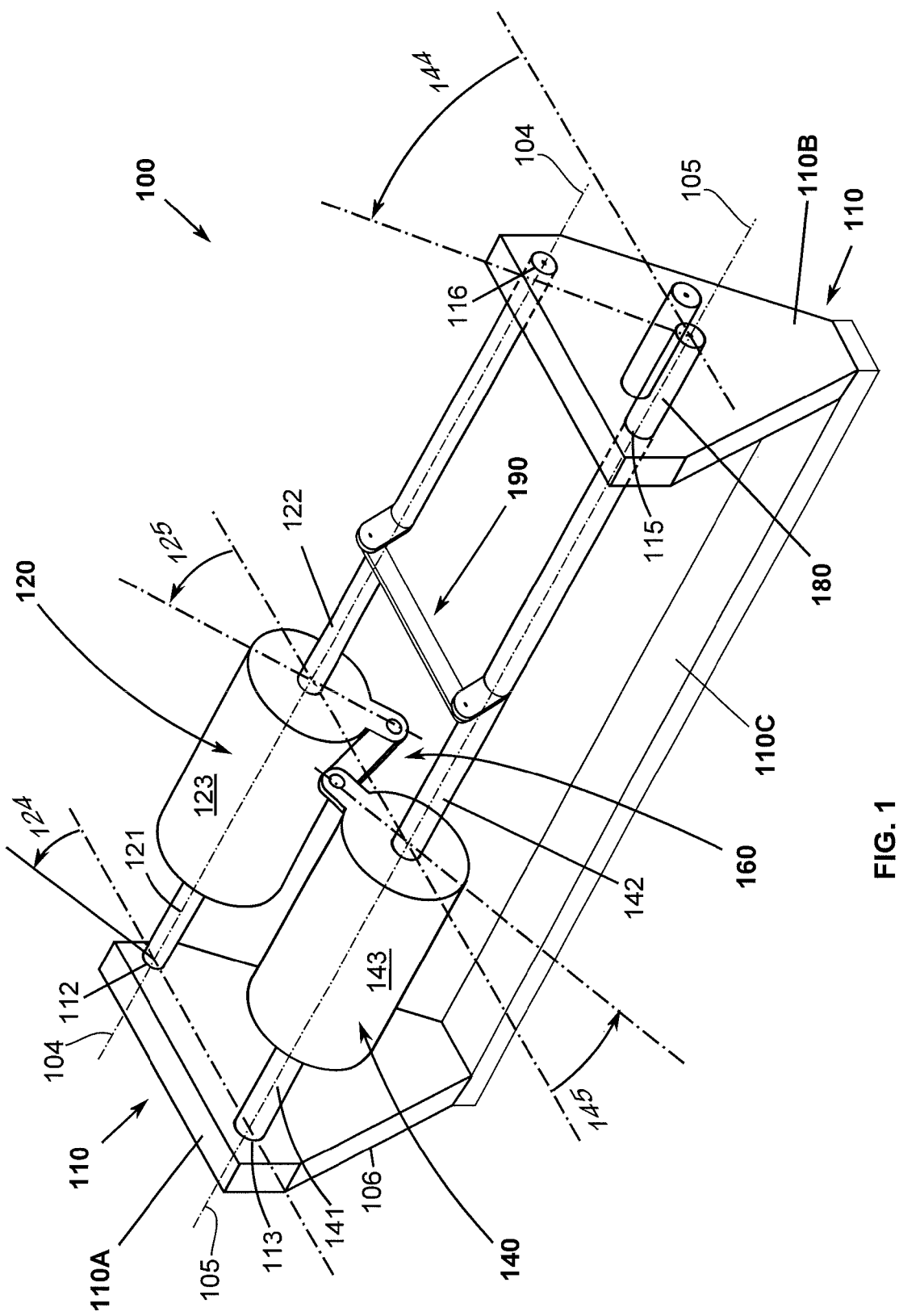
FIG. 1 is an isometric view of a first actuator system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and initially to FIG. 1 thereof, this invention provides an improved actuator system, of which a first embodiment is generally indicated at 100. Reference structure 110 may comprise a rigid material. Reference structure 110 has a first portion 110A and a second portion 110B, which are rigidly connected to each other through a third portion 110C. First portion 110A holds two couplings 112 and 113, which are connected to shaft 121 and shaft 141 respectively. Coupling 112 holds shaft 121 in rotary engagement for rotation relative to reference structure 110 about axis 104. Similarly, coupling 113 holds shaft 141 in rotary engagement for rotation relative to reference structure 110 about axis 105. Axes 104 and 105 are generally parallel to each other and separated by a fixed distance.

First rotary actuator 120 has a first member 123 and a second member 122 which are configured and arranged for relative rotary motion to each other about axis 104. Rotary actuator 120 is an electric motor, however other actuator types such as, but not limited to, hydraulic actuators, pneumatic actuators, or other similar actuators may also be used. First member 123 may be referred to as a stator and second member 122 may be referred to as a rotor, however, it should be noted that neither stator 123 nor rotor 122 are stationary relative to reference structure 110.

Rotor 122 is rigidly coupled to shaft 121. Stator 123 is specifically not rigidly mounted to reference structure 110. More concretely, stator 123 is able to rotate relative to reference structure 110 about axis 104 independent of the rotation of rotor 122 relative to reference structure 110. Stated another way, first rotary actuator 120 has two degrees of freedom relative to reference structure 110. A first degree of freedom can be defined as angle of rotation 124 of rotor 122 relative to reference structure 110. A second degree of freedom can be defined as angle of rotation 125 of stator 123 relative to reference structure 110.

Second rotary actuator member 140 has first member 143 and second member 142 which are configured and arranged for relative rotary motion to each other about axis 105. Rotary actuator 140 is an electric motor, however other actuator types such as, but not limited to hydraulic actuators, pneumatic actuators, or other similar actuators may also be used. First member 143 may be referred to as a stator and second member 142 may be referred to as a rotor. However, it should be noted that neither stator 143 nor rotor 142 are stationary relative to reference structure 110.

Rotor 142 is rigidly coupled to shaft 141. Stator 143 is specifically not rigidly mounted to reference structure 110. More concretely, stator 143 is able to rotate relative to reference structure 110 about axis 105 independent the rotation of rotor 142 relative to the reference structure 110. Stated another way, second actuator 140 has two degrees of freedom relative to reference structure 110. A first degree of freedom can be defined as angle of rotation 144 of rotor 142 relative to reference structure 110. A second degree of freedom can be defined as angle of rotation 145 of stator 123 relative to reference structure 110.

Output member 180 is rigidly coupled to rotor 142. Therefore, output member rotates together with rotor 142 relative to reference structure 110 about axis 105. Second portion 110B of reference structure 110 has couplings 115 and 116 which respectively provide additional support in holding output member 180 and rotor 122 in rotary engagement with reference structure 110. Output member 180 may be coupled to an object to be driven, such as an aircraft control surface.

Stator 123 and stator 143 are rotationally coupled together through coupling 160. Coupling 160 causes stator 123 to rotate relative to reference structure 110 by an angle opposite to the rotation of stator 143 relative to reference structure 110. More specifically, coupling 160 causes any change in angle 125 to cause an equal and opposite change in angle 145. In other words, a degree of freedom between rotary actuator 120 and reference structure 110 is caused to be shared with one degree of freedom between rotary actuator 140 and reference structure 110 by coupling 160. Coupling 160 is a link pivotally connected to stator 123 and pivotally connected to stator 143. Drive arm portion 123a is disposed on stator 123, and drive arm portion 143a is disposed on stator 143. Link 160a is pivotally connected between drive arm portions 123a and 143a. However, coupling 160 my alternatively be a gear coupling, a belt coupling, or other similar coupling.

Rotor 122 and rotor 142 are also coupled together through coupling 190. Coupling 190 causes rotor 122 to rotate relative to reference structure 110 by an angular direction equal to how rotor 142 rotates relative to reference structure 110. More specifically, coupling 190 causes any change in angle 124 to equal a change in angle 144. In other words, a degree of freedom between rotary actuator 120 and reference structure 110 is caused to be shared with one degree of freedom between rotary actuator 140 and reference structure 110 by coupling 190. As shown in FIG. 1, coupling 190 is a link 190a pivotally connected to drive arm portion 122A of member 122 and pivotally connected to drive arm portion 142A of member 142, however, coupling 190 my alternatively be a gear coupling, a belt coupling, or other similar coupling.

While coupling 160 causes stator 123 and stator 143 to rotate in opposite directions relative to reference structure 110, coupling 190 causes rotor 122 and rotor 142 to rotate in equivalent directions relative to reference structure 110.

Linkage 170 is a set of rigid links and joints between reference member 110 and output member 180. More specifically, linkage 170 comprises couplings 160 and 190, and members 121, 122, 123, 141, 142, and 143. Linkage 170 has two degrees of freedom relative to reference 110. In other words, the state of linkage 170 relative to reference 110 can be described by two independent variables. For example, knowing angle 144 (which represents the angle of rotor 142 to reference structure 110) and angle 124 (the angle of shaft 121 relative to reference structure 110) specifically define the state of linkage 170 since no member (link) within linkage 170 can be moved without adjusting angles 144 or 124. In this view, angle 124 and angle 144 represent two independent degrees of freedom of linkage 170. Alternatively, the two degrees of freedom of linkage 170 can be defined as angle 125 and angle 144. No linkage 170 member can be moved relative to linkage 110 without changing angle 125 or angle 144.

Rotary actuator 100 is generally operated by powering first actuator 120 and second actuator 140 together at the same time to cause output member 180 to move relative to reference structure 110 in a desired manner. For example, if a user desires to cause output member 180 to rotate clockwise relative to reference structure 110, in other words, if angle 144 is to be decreased, actuator 120 and actuator 140 would be actuated at the same time, actuator 120 providing a torque of equal and opposite magnitude as actuator 140. More specifically, actuator 120 is actuated so as to apply a torque urging rotor 122 to rotate clockwise relative to stator 123. At the same time, actuator 140 is actuated so as to apply a torque urging rotor 142 to rotate clockwise relative to stator 143. Under this scenario, counteracting torques from actuator 120 and actuator 140 act against each other through coupling 160. When actuator 120 applies a torque to rotor 122 in the clockwise direction, an equal and opposite torque is applied to coupling 160, urging coupling 160 to rotate counterclockwise. The torque applied by actuator 120 onto coupling 160 manifests as a downward rightwards force on coupling 160. When actuator 140 applies a torque to rotor 142 in the clockwise direction, an equal and opposite torque is applied to coupling 160. The torque applied by actuator 140 onto coupling 160 manifests as an upwards-leftwards force applied on coupling 160 by actuator 140. The force applied by actuator 120 onto coupling 160 is generally equal and opposite the force applied by actuator 140 onto coupling 160. This generally results in stators 123 and 143 remaining stationary while rotors 122 and 142 rotate clockwise. Coupling 190 causes the angles of rotation 124, 144 of rotors 122 and 142 relative to reference structure 110 to remain equivalent.

In order to cause output member 180 to rotate counter clockwise relative to reference structure 110, rotary actuators 120 and 140 are actuated in the reverse direction compared to when causing output member 180 to rotate clockwise.

Actuator 100 has the advantageous characteristic that if either actuator 120 or actuator 140 lock up (such as an electromechanical jam, or hydraulic valve lock), output member 180 will continue to be actuated in the desired direction of rotation by the non-failing actuator. This is because the locked up actuator will still be able to provide a counteracting torque to the other actuator through coupling 160. For example, consider a user desiring to rotate output member 180 clockwise relative to reference structure 110 (decreasing angle 144) when actuator 120 inadvertently rotationally locks stator 123 relative to rotor 122. Because stator 123 is rotationally locked to rotor 122, any change in angle 124 between rotor 122 and reference structure 110 will necessary equal any change in angle 125 between stator 123 and reference structure 110. Note that stator 123 and rotor 122 may still rotate together as a unit relative to reference structure 110. When actuator 140 applies a clockwise torque to rotor 142, the equal and opposite torque on stator 143 is distributed through coupling 160 as an upwards and leftwards force on coupling 160. This upwards and leftwards force on coupling 160 results in a clockwise torque applied to stator 123 which is transmitted through the locked up actuator as a clockwise torque onto rotor 122. Coupling 190 causes the rotation of rotors 122 and 142 to be equalized, while output member 180 is rotated clockwise as desired through the jam.

In order to operate in a dual tandem mode, each actuator 120, 140 is provided with a braking mechanism which may be internal or external and a controller. These brakes will allow the actuator system 100 to continue working if one of the actuators fails in an open state (e.g. an actuator loses power allowing the stator and rotor free rotation relative to each other). The brake is configured within each actuator to lock rotation between the actuators stator and rotor relative to each other. The brake may be a fail-safe brake which does not need power in order to brake. In this dual tandem configuration, when one of the actuators 120, 140 fails in an open state, the brake in that failing actuator is engaged. This allows the remaining actuator 120, 140 to still cause actuation of output member 180. However, during such a failure the speed that output member 180 rotates relative to the working actuator will be half the speed that the output member 180 rotates at when both actuators are working.

Figure 2:
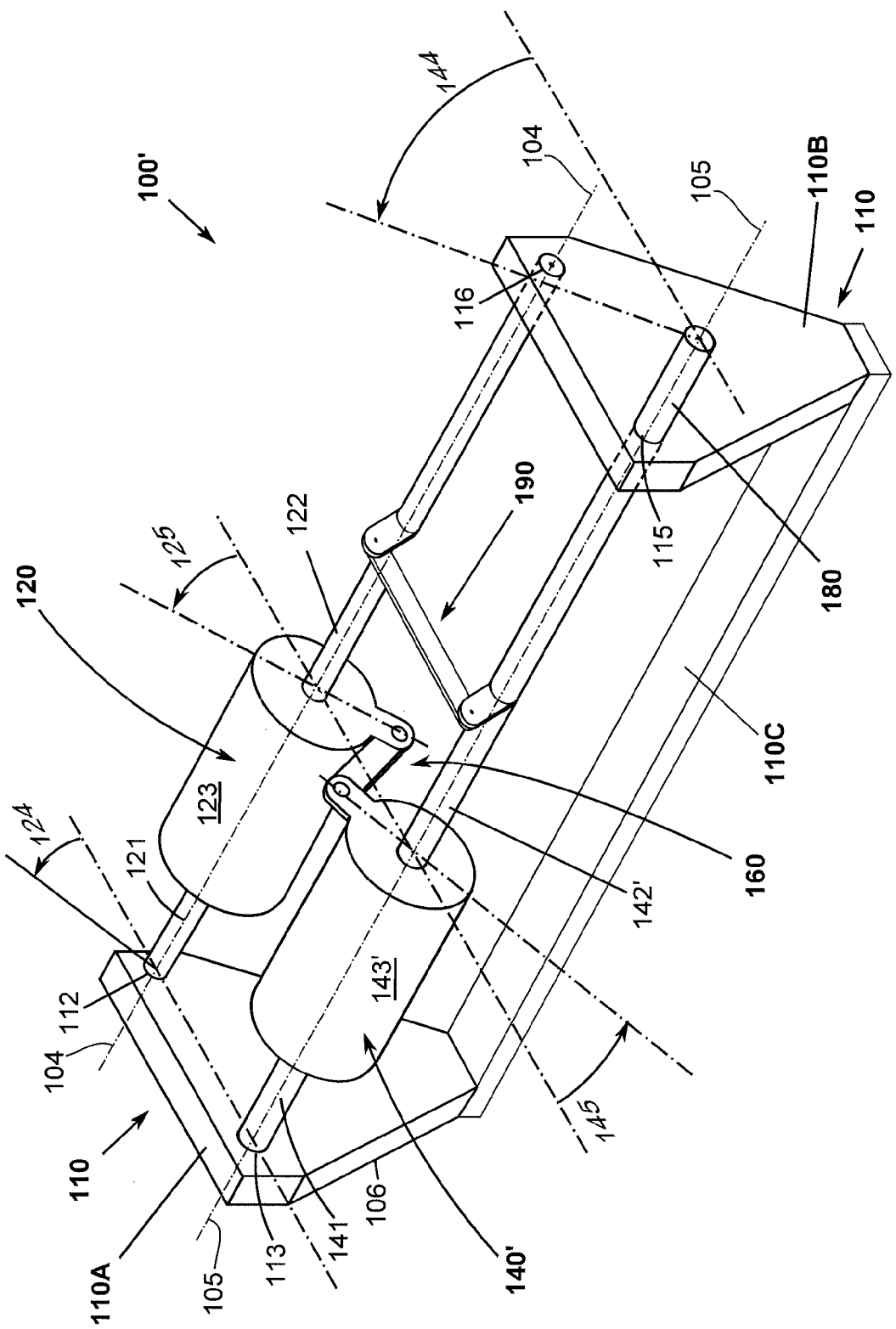
FIG. 2 is an isometric view of an alternate embodiment of the first actuator system.

Turning to FIG. 2, which shows an alternate embodiment 100', actuator 120 is paired with a holding device 140' which includes, but is not limited to, a brake, a magnetic clutch, a toroid motor, or the like. Under normal operation, holding device 140' locks the rotational position between member 143' and member 142'. If the actuator 120 jams then the holding device 140' releases the lock between member 143' and member 142' which effectively releases any effect actuator 120 has on output member 180. This allows output member 180 to be driven by another actuator (not shown). This arrangement is a simplex configuration because it includes one actuator 120 and one holding device 140' and if the actuator 120 fails, the unit drops out of the network as will be described in greater detail below. In yet another alternate simplex configuration, two actuators may be provided without any brakes on either actuator, where one actuator is configured to only hold its rotor and stator position, while the other actuator is used to drive output member 180 through linkage system 170.

Figure 3:
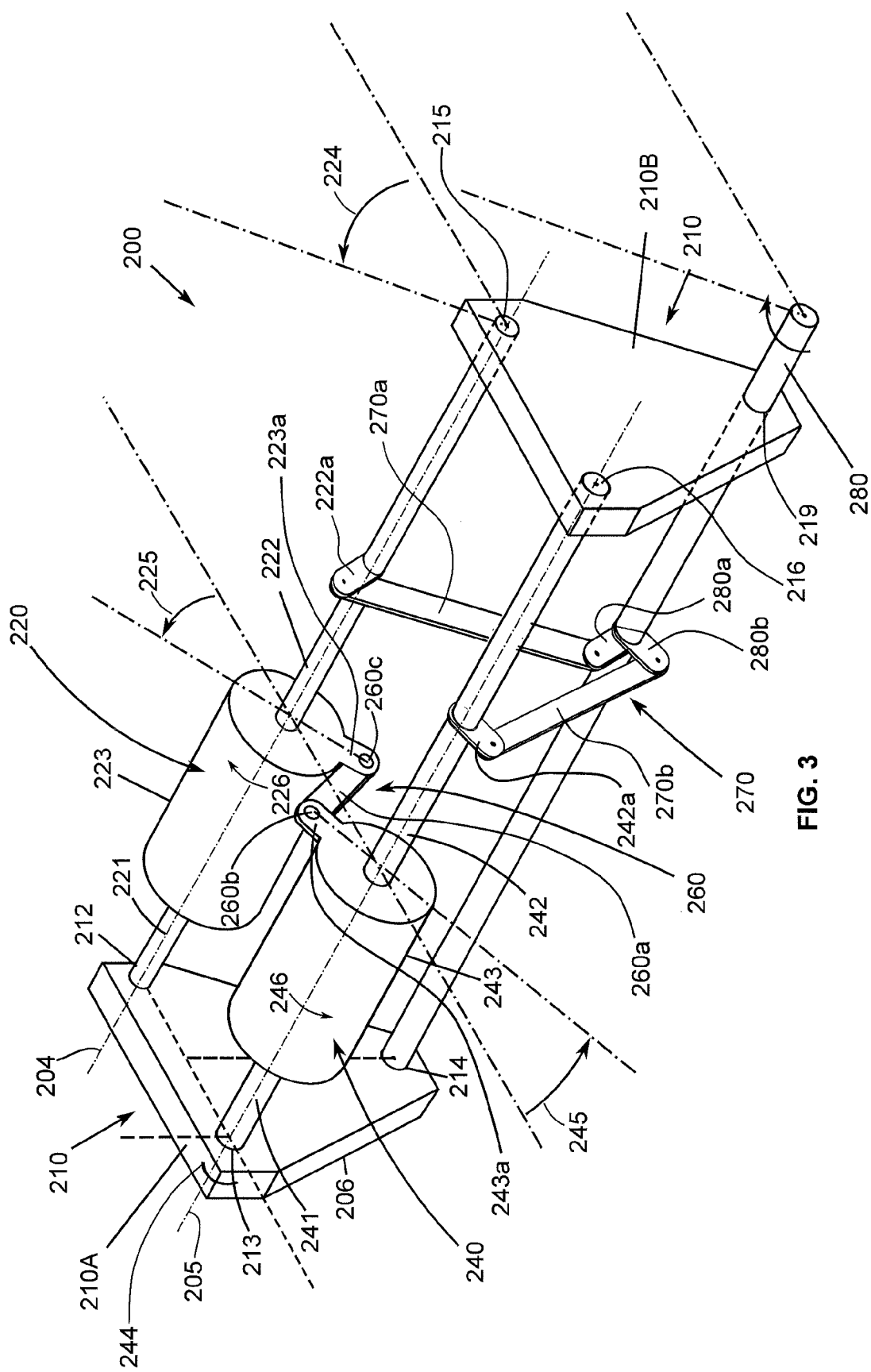
FIG. 3 is a perspective view of a second actuator system.

In FIG. 3, a second actuator system is generally indicated at 200. Reference structure 210 comprises a rigid material. Reference structure 210 has a first portion 210A and a second portion 210B, which are fixed. First portion 210A holds two couplings 212 and 213, which are connected to shaft 221 and shaft 241 respectively. Coupling 212 holds shaft 221 in rotary engagement for rotation relative to reference structure 210 about axis 204. Similarly, coupling 213 holds shaft 241 in rotary engagement for rotation relative to reference structure 210 about axis 205. Axes 204 and 205 are generally parallel to each other and separated by a fixed distance.

First rotary actuator 220 has a first member 223 and a second member 222 which are configured and arranged for relative rotary motion to each other about axis 204. Rotary actuator 220 is an electric motor, however other actuator types such as, but not limited to, hydraulic actuators, pneumatic actuators, or other similar actuators may also be used. First member 223 may be referred to as a stator and second member 222 may be referred to as a rotor, however, it should be noted that neither stator 223 nor rotor 222 are stationary relative to reference structure 210.

Rotor 222 is rigidly coupled to shaft 221. Stator 223 is specifically not rigidly mounted to reference structure 210. More concretely, stator 223 is able to rotate relative to reference structure 210 about axis 204 independent of the rotation of rotor 222 relative to reference structure 210. Stated another way, first rotary actuator 220 has two degrees of freedom relative to reference structure 210. A first degree of freedom can be defined as angle of rotation 224 of rotor 122 relative to reference structure 210. A second degree of freedom can be defined as angle of rotation 225 of stator 223 relative to reference structure 210.

Second rotary actuator member 240 has first member 243 and second member 242 which are configured and arranged for relative rotary motion to each other about axis 205. Rotary actuator 240 is an electric motor, however other actuator types such as, but not limited to hydraulic actuators, pneumatic actuators, or other similar actuators may also be used. First member 243 may be referred to as a stator and second member 242 may be referred to as a rotor. However, it should be noted that neither stator 243 nor rotor 242 are stationary relative to reference structure 210.

Rotor 242 is rigidly coupled to shaft 241. Stator 243 is specifically not rigidly mounted to reference structure 210. More concretely, stator 243 is able to rotate relative to reference structure 210 about axis 205 independent the rotation of rotor 242 relative to the reference structure 210. Stated another way, second actuator 240 has two degrees of freedom relative to reference structure 210. A first degree of freedom can be defined as angle of rotation 244 of rotor 242 relative to reference structure 210. A second degree of freedom can be defined as angle of rotation 245 of stator 223 relative to reference structure 210.

Output member 280 is coupled to rotors 222, 242. Therefore, output member 280 rotates together with rotors 222, 242 relative to reference structure 210. Second portion of 210B reference structure 210 has couplings 215 and 216 which respectively provide additional support in holding rotors 222, 242 in rotary engagement with reference structure 210. Couplings 214, 219 hold output member 280 in rotary engagement for rotation relative to reference structure 210. Output member 280 may be coupled to an object to be driven, such as an aircraft control surface.

Stator 223 and stator 243 are rotationally coupled together through coupling 260. Coupling 260 causes stator 223 to rotate relative to reference structure 210 by an angle opposite to the rotation of stator 243 relative to reference structure 210. More specifically, coupling 260 causes any change in angle 225 to cause an equal and opposite change in angle 245. In other words, a degree of freedom between rotary actuator 220 and reference structure 210 is caused to be shared with one degree of freedom between rotary actuator 240 and reference structure 210 by coupling 260. Coupling 260 is a link 260a pivotally connected to drive arm portion 223a of stator 223 and pivotally connected to drive arm portion 243a of stator 243. However, coupling 260 may alternatively be a gear coupling, a belt coupling, or other similar coupling.

Rotor 222 and rotor 242 are both coupled to output member 280 through coupling 270. Coupling 270 causes the rotation of both rotors 222 and 242 to be transmitted to the output member 280 such that the output member 280 rotates in the same direction as the rotors 222, 242 relative to the reference structure 210. More specifically, coupling 270 causes the rotation of the rotors 222, 242 to be summed together at the output member 280. Coupling 270 comprises a pair of links 270a and 270b. Link 270a is pivotally connected between drive arm portion 222A of member 222 and drive arm portion 280a of output member 280. Link 270b is pivotally connected between drive arm portion 242A of member 242 and drive arm portion 280b of output member 280. However, coupling 270 may alternatively be a gear coupling, a belt coupling, or other similar coupling.

While coupling 260 causes stator 223 and stator 243 to rotate in opposite directions relative to reference structure 210, coupling 270 causes rotor 122 and rotor 142 to rotate in equivalent directions relative to reference structure 210.

Linkage 290 is a set of rigid links and joints between reference member 210 and output member 280. More specifically, linkage 290 comprises couplings 260 and 270, and members 221, 222, 223, 241, 242, and 243. Linkage 290 has two degrees of freedom relative to reference 210. In other words, the state of linkage 290 relative to reference 210 can be described by two independent variables. For example, knowing angle 244 (which represents the angle of rotor 242 to reference structure 210) and angle 224 (the angle of shaft 221 relative to reference structure 210) specifically define the state of linkage 290 since no member (link) within linkage 290 can be moved without adjusting angles 244 or 224. In this view, angle 224 and angle 244 represent two independent degrees of freedom of linkage 290. Alternatively, the two degrees of freedom of linkage 290 can be defined as angle 225 and angle 244. No linkage 290 member can be moved relative to linkage 210 without changing angle 225 or angle 244.

Rotary actuator 200 is generally operated by powering first actuator 220 and second actuator 240 together at the same time to cause output member 280 to move relative to reference structure 210 in a desired manner. For example, if a user desires to cause output member 280 to rotate clockwise relative to reference structure 210 (as shown in the apparatus orientation in FIG. 2), actuator 220 and actuator 240 would be actuated at the same time, actuator 220 providing a torque of equal and opposite magnitude as actuator 240. More specifically, actuator 220 is actuated so as to apply a torque urging rotor 222 to rotate clockwise relative to stator 223. At the same time, actuator 240 is actuated so as to apply a torque urging rotor 242 to rotate clockwise relative to stator 243. Under this scenario, counteracting torques from actuator 220 and actuator 240 act against each other through coupling 260. More specifically, when actuator 220 applies a torque to rotor 222 in the clockwise direction, an equal and opposite torque is applied to coupling 260, urging coupling 260 to rotate counterclockwise. The torque applied by actuator 220 onto coupling 260 manifests as a downward rightwards force on coupling 260. When actuator 240 applies a torque to rotor 242 in the clockwise direction, an equal and opposite torque is applied to coupling 260. The torque applied by actuator 240 onto coupling 260 manifests as an upwards-leftwards force applied on coupling 260 by actuator 240. The force applied by actuator 220 onto coupling 260 is generally equal and opposite the force applied by actuator 240 onto coupling 260. This generally results in stators 223 and 243 remaining stationary while rotors 222 and 242 rotate clockwise. Coupling 270 causes the angles of rotation 224, 244 of rotors 222 and 242 relative to reference structure 210 to remain equivalent.

In order to cause output member 280 to rotate counter clockwise relative to reference structure 210, rotary actuators 220 and 240 are actuated in reverse compared to when causing output member 280 to rotate clockwise.

In order to operate in a dual tandem mode, each actuator 220, 240 is provide with a brake that may be internal or external and a controller. If one of the actuators 220, 240 loses power then the brake in the failing unit will be applied, allowing the remaining actuator 220, 240 to move the output member at one half normal speed. Actuator 200 also has the advantageous characteristic that if either actuator 220 or actuator 240 lock up (such as an electromechanical jam, or hydraulic valve lock), output member 280 will continue to be actuated in the desired direction of rotation by the non-failing actuator. This is because the locked up actuator will still be able to provide a counteracting torque to the other actuator through coupling 260. For example, consider a user desiring to rotate output member 280 clockwise relative to reference structure 210 when actuator 220 inadvertently rotationally locks stator 223 relative to rotor 222. Because stator 223 is rotationally locked to rotor 222, any change in angle 224 between rotor 222 and reference structure 210 will necessary equal any change in angle 225 between stator 223 and reference structure 210. Note that stator 223 and rotor 222 may still rotate together as a unit relative to reference structure 210. When actuator 240 applies a clockwise torque to rotor 242, the equal and opposite torque on stator 243 is distributed through coupling 260 as an upwards and leftwards force on coupling 260. This upwards and leftwards force on coupling 260 results in a clockwise torque applied to stator 223 which is transmitted through the locked up actuator as a clockwise torque onto rotor 2122. Coupling 270 causes the rotation of rotors 222 and 242 to be equalized, while output member 280 is rotated clockwise as desired through the jam.

Figure 4:
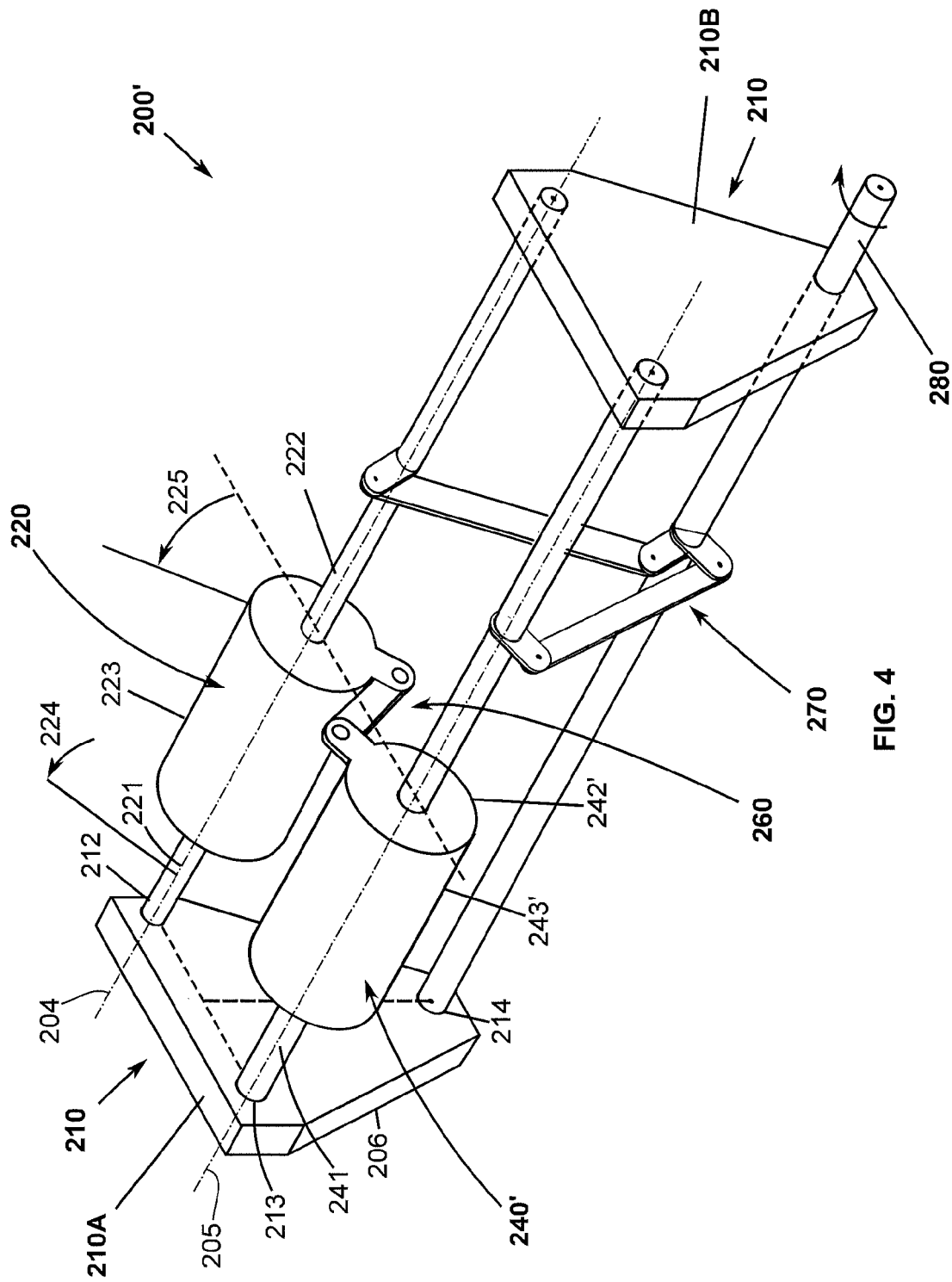
FIG. 4 is a perspective view of an alternate embodiment of the second actuator system.

Turning to FIG. 4, the actuator 220 is paired with holding device 240' which includes, but is not limited to, a brake, a magnetic clutch, a toroid motor or the like. Under normal operation, holding device 240' locks member 243' and rotor 242' relative to each other. If the actuator 220 jams or loses power then the holding device 240' releases the rotor 242' and the actuator 220 and hold device 240' go into a bypass mode and rotate freely under the power of another actuator in the network. In yet another simplex configuration, actuators 220 and 240 of FIG. 3 may be provided without any brakes.

Figure 5:
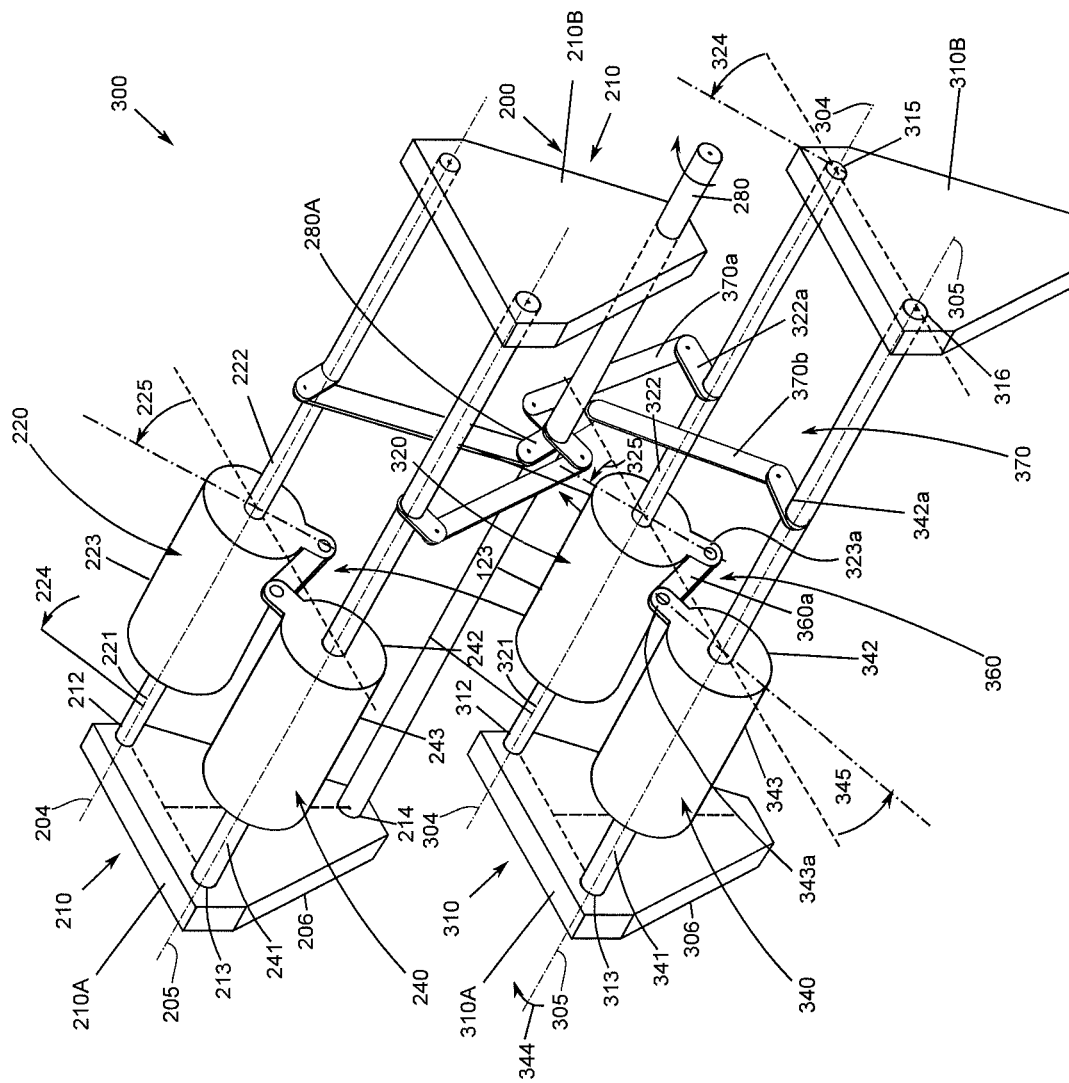
FIG. 5 is a perspective view of a third actuator system.

Turning to FIG. 5, a system with dual tandem actuators 220 and 240 is paired with dual tandem actuators 320 and 340 to form a third actuator system generally indicated at 300. Reference structure 310 comprises a rigid material. Reference structure 310 has a first portion 310A and a second portion 310B, which are fixed. First portion 310A holds two couplings 312 and 313, which are connected to shaft 321 and shaft 341 respectively. Coupling 312 holds shaft 321 in rotary engagement for rotation relative to reference structure 310 about axis 304. Similarly, coupling 313 holds shaft 341 in rotary engagement for rotation relative to reference structure 310 about axis 305. Axes 304 and 305 are generally parallel to each other and separated by a fixed distance.

First rotary actuator 320 has a first member 323 and a second member 322 which are configured and arranged for relative rotary motion to each other about axis 304. Rotary actuator 320 is an electric motor, however other actuator types such as, but not limited to, hydraulic actuators, pneumatic actuators, or other similar actuators may also be used. First member 323 may be referred to as a stator and second member 322 may be referred to as a rotor, however, it should be noted that neither stator 323 nor rotor 322 are stationary relative to reference structure 310.

Rotor 322 is rigidly coupled to shaft 321. Stator 323 is specifically not rigidly mounted to reference structure 310. More concretely, stator 323 is able to rotate relative to reference structure 310 about axis 304 independent of the rotation of rotor 322 relative to reference structure 310. Stated another way, first rotary actuator 320 has two degrees of freedom relative to reference structure 310. A first degree of freedom can be defined as angle of rotation 324 of rotor 322 relative to reference structure 310. A second degree of freedom can be defined as angle of rotation 325 of stator 323 relative to reference structure 310.

Second rotary actuator member 340 has first member 343 and second member 342 which are configured and arranged for relative rotary motion to each other about axis 305. Rotary actuator 340 is an electric motor, however other actuator types such as, but not limited to hydraulic actuators, pneumatic actuators, or other similar actuators may also be used. First member 343 may be referred to as a stator and second member 342 may be referred to as a rotor. However, it should be noted that neither stator 343 nor rotor 342 are stationary relative to reference structure 310.

Rotor 342 is rigidly coupled to shaft 341. Stator 343 is specifically not rigidly mounted to reference structure 310. More concretely, stator 343 is able to rotate relative to reference structure 310 about axis 305 independent the rotation of rotor 342 relative to the reference structure 310. Stated another way, second actuator 340 has two degrees of freedom relative to reference structure 310. A first degree of freedom can be defined as angle of rotation 344 of rotor 342 relative to reference structure 310. A second degree of freedom can be defined as angle of rotation 345 of stator 323 relative to reference structure 310.

Output member 280 is coupled to rotors 322, 342. Therefore, output member 280 rotates together with rotors 322, 342 relative to reference structure 310. Second portion of 310B reference structure 310 has couplings 315 and 316 which respectively provide additional support in holding rotors 322, 342 in rotary engagement with reference structure 310. Output member 280 may be coupled to an object to be driven, such as an aircraft control surface.

Stator 323 and stator 343 are rotationally coupled together through coupling 360. Coupling 360 causes stator 323 to rotate relative to reference structure 310 by an angle opposite to the rotation of stator 343 relative to reference structure 310. More specifically, coupling 360 causes any change in angle 325 to cause an equal and opposite change in angle 345. In other words, a degree of freedom between rotary actuator 320 and reference structure 310 is caused to be shared with one degree of freedom between rotary actuator 340 and reference structure 310 by coupling 360. Coupling 360 is a link 360a pivotally connected to drive arm portion 323a of stator 323 and pivotally connected to drive arm portion 343a of stator 343. However, coupling 360 may alternatively be a gear coupling, a belt coupling, or other similar coupling.

Rotor 322 and rotor 342 are both coupled to output member 280 through coupling 370. Coupling 370 causes the rotation of both rotors 322 and 342 to be transmitted to the output member 280 such that the output member 280 rotates in the same direction as the rotors 322, 342 relative to the reference structure 310. More specifically, coupling 370 causes the rotation of the rotors 322, 342 to be summed together at the output member 280. Coupling 370 comprises a pair of links 370a and 370b. Link 370a is pivotally connected between drive arm portion 322A of member 322 and drive arm portion 280a of output member 280. Link 370b is pivotally connected between drive arm portion 342a of member 342 and drive arm portion 280b of output member 280. However, coupling 370 may alternatively be a gear coupling, a belt coupling, or other similar coupling.

While coupling 360 causes stator 323 and stator 343 to rotate in opposite directions relative to reference structure 310, coupling 370 causes rotor 322 and rotor 342 to rotate in equivalent directions relative to reference structure 310.

Linkage 390 is a set of rigid links and joints between reference member 310 and output member 280. More specifically, linkage 390 comprises couplings 360 and 370, and members 321, 322, 323, 341, 342, and 343. Linkage 390 has two degrees of freedom relative to reference 310. In other words, the state of linkage 390 relative to reference 310 can be described by two independent variables. For example, knowing angle 344 (which represents the angle of rotor 342 to reference structure 310) and angle 324 (the angle of shaft 321 relative to reference structure 310) specifically define the state of linkage 390 since no member (link) within linkage 390 can be moved without adjusting angles 344 or 324. In this view, angle 324 and angle 344 represent two independent degrees of freedom of linkage 390. Alternatively, the two degrees of freedom of linkage 390 can be defined as angle 325 and angle 344. No linkage 390 member can be moved relative to linkage 310 without changing angle 325 or angle 344.

Rotary actuator 300 is generally operated by powering first actuator 320 and second actuator 340 together at the same time to cause output member 380 to move relative to reference structure 310 in a desired manner. For example, if a user desires to cause output member 280 to rotate clockwise relative to reference structure 310 (as shown in the apparatus orientation in FIG. 5), actuator 320 and actuator 340 would be actuated at the same time, actuator 320 providing a torque of equal and opposite magnitude as actuator 340. More specifically, actuator 320 is actuated so as to apply a torque urging rotor 322 to rotate clockwise relative to stator 323. At the same time, actuator 340 is actuated so as to apply a torque urging rotor 342 to rotate clockwise relative to stator 343. Under this scenario, counteracting torques from actuator 320 and actuator 340 act against each other through coupling 360. More specifically, when actuator 320 applies a torque to rotor 322 in the clockwise direction, an equal and opposite torque is applied to coupling 360, urging coupling 360 to rotate counterclockwise. The torque applied by actuator 320 onto coupling 360 manifests as a downward rightwards force on coupling 360. When actuator 340 applies a torque to rotor 342 in the clockwise direction, an equal and opposite torque is applied to coupling 360. The torque applied by actuator 340 onto coupling 360 manifests as an upwards-leftwards force applied on coupling 360 by actuator 340. The force applied by actuator 320 onto coupling 360 is generally equal and opposite the force applied by actuator 340 onto coupling 360. This generally results in stators 323 and 343 remaining stationary while rotors 322 and 342 rotate clockwise. Coupling 370 causes the angles of rotation 324, 344 of rotors 322 and 342 relative to reference structure 310 to remain equivalent.

In order to cause output member 280 to rotate counter clockwise relative to reference structure 310, rotary actuators 320 and 340 are actuated in reverse compared to when causing output member 280 to rotate clockwise.

In order to operate in a dual tandem mode, each actuator 220, 240, 320, 340 is provided with a brake that may be internal or external and a controller. If one or more of the actuators 220, 240, 320, 340 lose power then one of the remaining actuators 220, 240, 320, 340 can move the output member 280. The third actuator system 300 also has the advantageous characteristic that if any of the actuators 220, 240, 320, 340 lock up (such as an electromechanical jam, or hydraulic valve lock), output member 280 will continue to be actuated in the desired direction of rotation by at least one of the non-failing actuators. This is because, in the case of failure of actuator 220 or 240, the locked up actuator will still be able to provide a counteracting torque to the other actuator through coupling 260. For example, consider a user desiring to rotate output member 280 clockwise relative to reference structure 210 when actuator 220 inadvertently rotationally locks stator 223 relative to rotor 222. Because stator 223 is rotationally locked to rotor 222, any change in angle 224 between rotor 222 and reference structure 210 will necessary equal any change in angle 225 between stator 223 and reference structure 210. Note that stator 223 and rotor 222 may still rotate together as a unit relative to reference structure 210. When actuator 240 applies a clockwise torque to rotor 242, the equal and opposite torque on stator 243 is distributed through coupling 260 as an upwards and leftwards force on coupling 260. This upwards and leftwards force on coupling 260 results in a clockwise torque applied to stator 223 which is transmitted through the locked up actuator as a clockwise torque onto rotor 2122. Coupling 270 causes the rotation of rotors 222 and 242 to be equalized, while output member 280 is rotated clockwise as desired through the jam. Also, rotors 320, 340 continue to rotate output member 280 in the clockwise direction.

Figure 6:
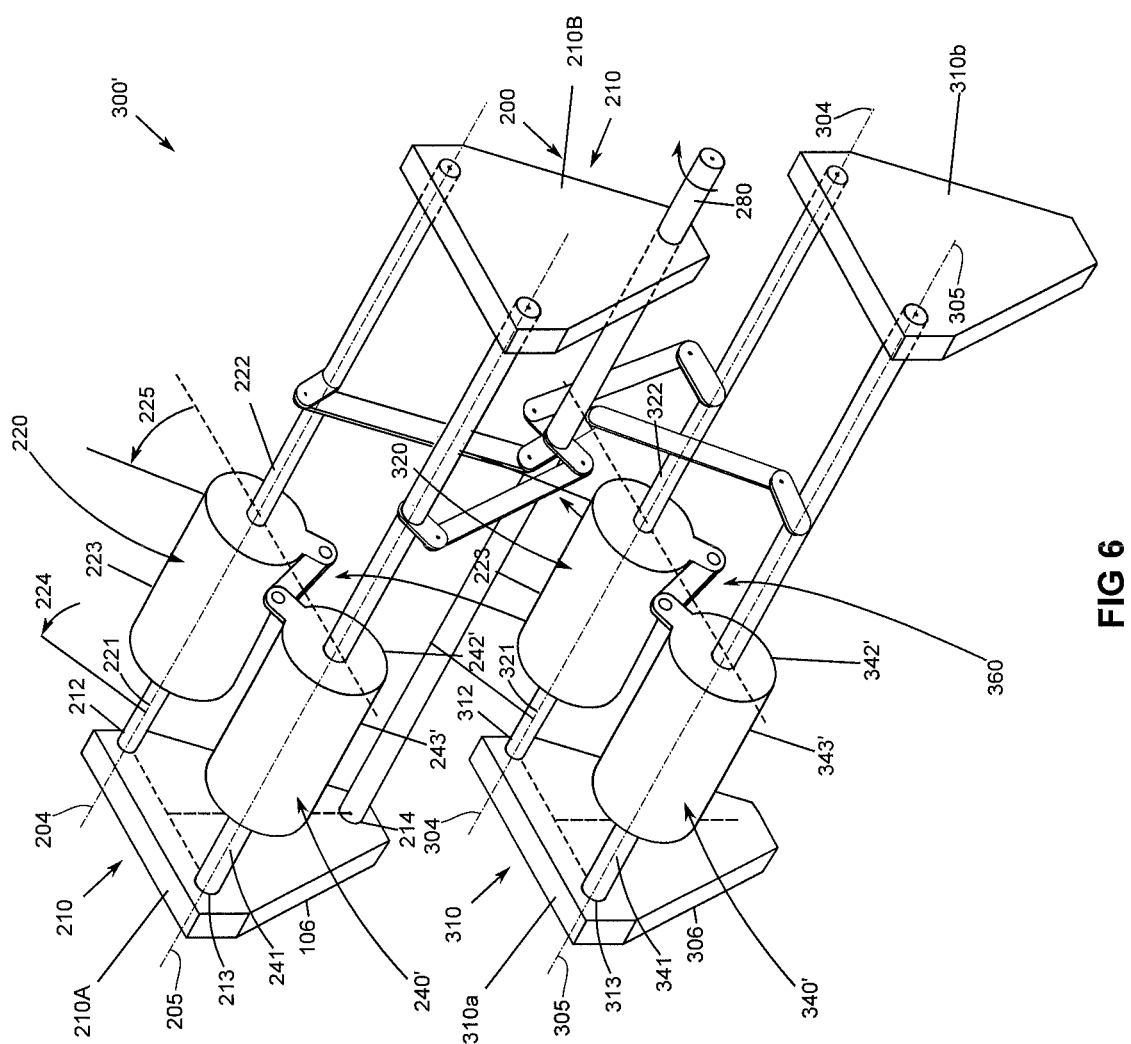
FIG. 6 is an alternate embodiment of the third actuator system.

Turning to FIG. 6, each of the actuators 220, 320 is paired with a holding device 240' and 340' for simplex unit operation as described above in connection with FIGS. 2 and 4.

Figure 7:
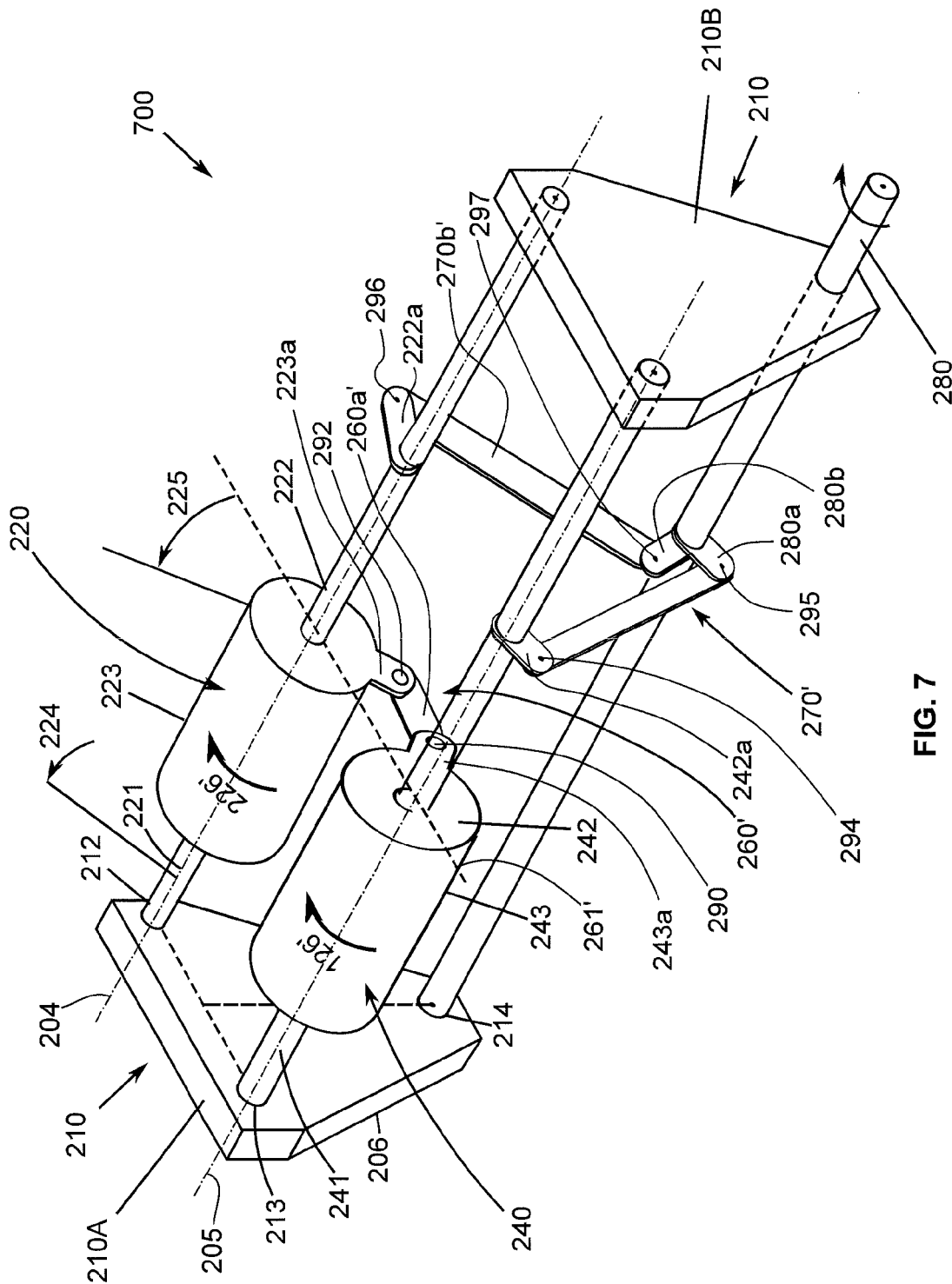
FIG. 7 is an alternate embodiment of the second actuator system.

In FIG. 7, coupling 260' includes a link 260a' that pivotally connects between drive arm portion 243a of stator 243 and drive arm portion 223a of stator 223 at pivot points 290, 292. In contrast to the arrangement of coupling 260, the link 260a' does not cross a line 261' between the centers of axes 204 and 205. The coupling 270' includes a link 270a' pivotally connected between drive arm portion 242a and drive portion 280a of output member 280 at pivot points 294, 295 and a link 270b' pivotally connected between drive arm portion 222a and drive portion 280 b of output member 280 at pivot points 296, 297. The link 270b' crosses over to the opposite side of axis 205.

Figure 8:
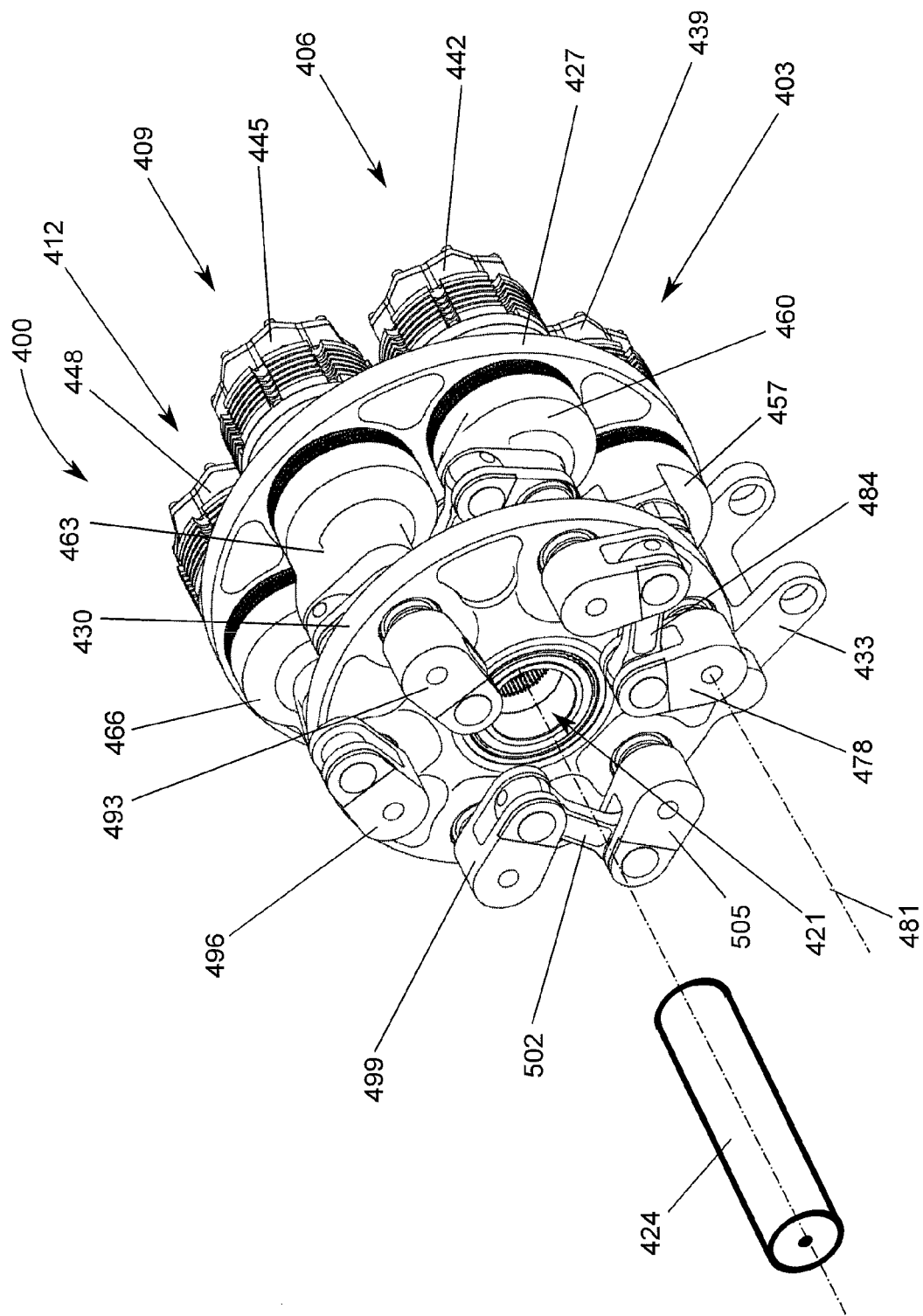
FIG. 8 is a front perspective view of a fourth actuator system.
Figure 9:
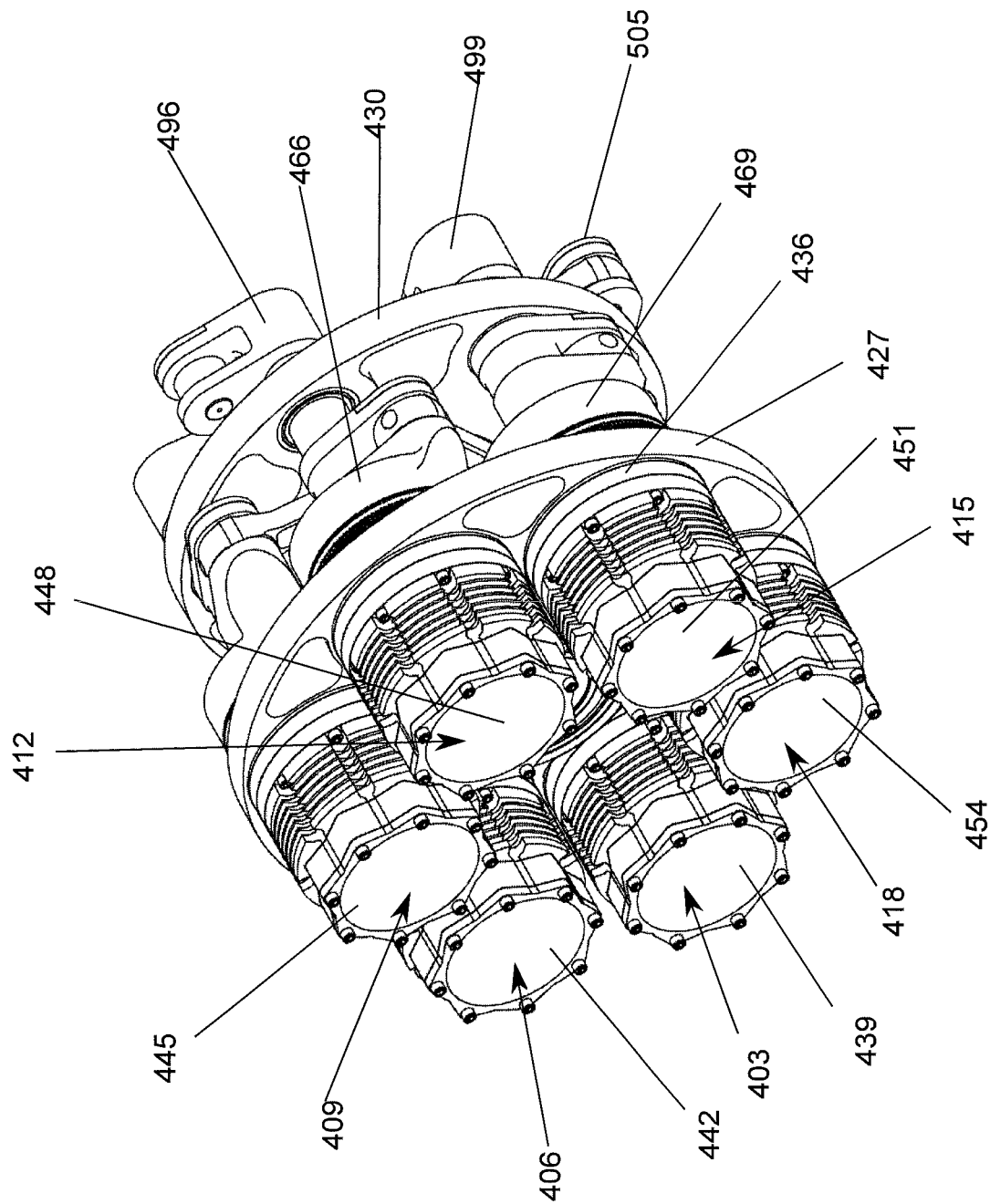
FIG. 9 is a rear perspective view of the fourth actuator system.

Referring generally to FIGS. 8-11 and initially to FIG. 8, a fourth actuator system 400 includes six actuators 403, 406, 409, 412, 415 (FIG. 9), and 418 (FIG. 9). The actuators are arranged with moment cancellation and are all mechanically coupled to a common output member 421 (FIG. 12) as described in detail below. The actuators may be arranged in pairs that may be dual tandem or simplex pairs. In the case of simplex pair units, one of the actuators in each pair is substituted with a holding device as described above. In the case of loss of power or a jam for an actuator paired with a holding device, the unit drops out of the network and freely rotates. In the case of a dual tandem unit, each actuator is provided with a brake that may be internal or external and a controller such that loss of power for one actuator of the pair results in the other actuator of the pair moving the tandem unit together.

Output member 421 is configured to engage with a shaft 424. As shown, the shaft 424 is a spline shaft, however, it will be evident to those of ordinary skill in the art based on this disclosure that other mechanical means for transmitting rotation from the output member 421 may also be used. Reference structure 427 and reference structure 430 are rigid members. A link 433 is fixedly attached to the reference structures 427, 430. Reference structure 430 includes bearing 431.

Starting at the bottom FIG. 8, and working counterclockwise, a moment canceling arm 478 is connected to stator 439 of first actuator 403. The moment canceling arm 478 rotates with the stator 439 about axis 481. A link 484 is pivotally attached to arm 478 at one end and is pivotally attached to a moment canceling arm 487 connected to the stator 442 of actuator 406 which forms a pair with actuator 403. Continuing counterclockwise, moment canceling arm 493 is connected to the stator 445 of actuator 409. The link that connects arm 493 to its neighboring arm 496 has been removed for clarity. Moment canceling arm 496 is connected to stator 448 of actuator 412. Moment canceling arm 499 is connected to stator 451 of actuator 415. A link 502 is pivotally attached to arm 499 at one end and is pivotally attached to arm 505 at the opposite end. Arm 505 is connected to stator 454 of actuator 418. The rotors 457, 460, 463 etc. are disposed between reference structures 427 and 430 and rotate relative to their respective stators. The rotors are coupled to the output member 421 as described in detail below.

Reference structure 427 includes bearings 436 (best shown in FIG. 15) for holding Stators 439, 442, 445, 448, 451, and 454 (FIG. 13) in rotary engagement for rotation relative to reference structure 427.

Turning to FIG. 12 rotors 457, 460, 463, 466, 469, 472 are configured and arranged for rotary motion relative to their respective stators. The rotors 457, 460, 463, 466, 469, 472 are mechanically coupled to the output member 421. Starting at the bottom right hand side of FIG. 12 and moving counterclockwise, drive arm portion 511 of rotor 457 rotates with the rotor 457 about axis 514 normal to the page. A link 517 is pivotally connected to drive arm portion 511 at one end and is pivotally connected to a crank 520 at the opposite end. The crank 520 is fixedly attached to the output member 421. Drive arm portion 523 of rotor 460 rotates with rotor 460 about axis 526 normal to the page. A link 529 is pivotally connected to drive arm portion 523 at a first end and is pivotally connected to a crank 532 at a second end. The crank 532 is fixedly attached to the output member 421 and is positioned below crank 520 with respect to the orientation of FIG. 12. Drive arm portion 535 of rotor 463 rotates with rotor 463 about axis 538 normal to the page. A link 541 is pivotally connected to drive arm portion 535 at a first end and is pivotally connected to crank 520 at the opposite end. Drive arm portion 544 of rotor 466 rotates with rotor 466 about axis 547 normal to the page. A link 550 is pivotally connected to drive arm portion 544 at a first end and is pivotally connected to crank 532 at the opposite end. Drive arm portion 553 of rotor 469 rotates with rotor 469 about axis 556 normal to the page. A link 557 is pivotally connected to drive arm 553 at a first end and is pivotally connected to crank 520 at the opposite end. Drive arm 559 of rotor 472 rotates with rotor 472 about axis 562 normal to the page. A link 565 is pivotally connected to the drive arm 559 at a first end and is pivotally connected to crank 532 at the opposite end.

Figure 14:
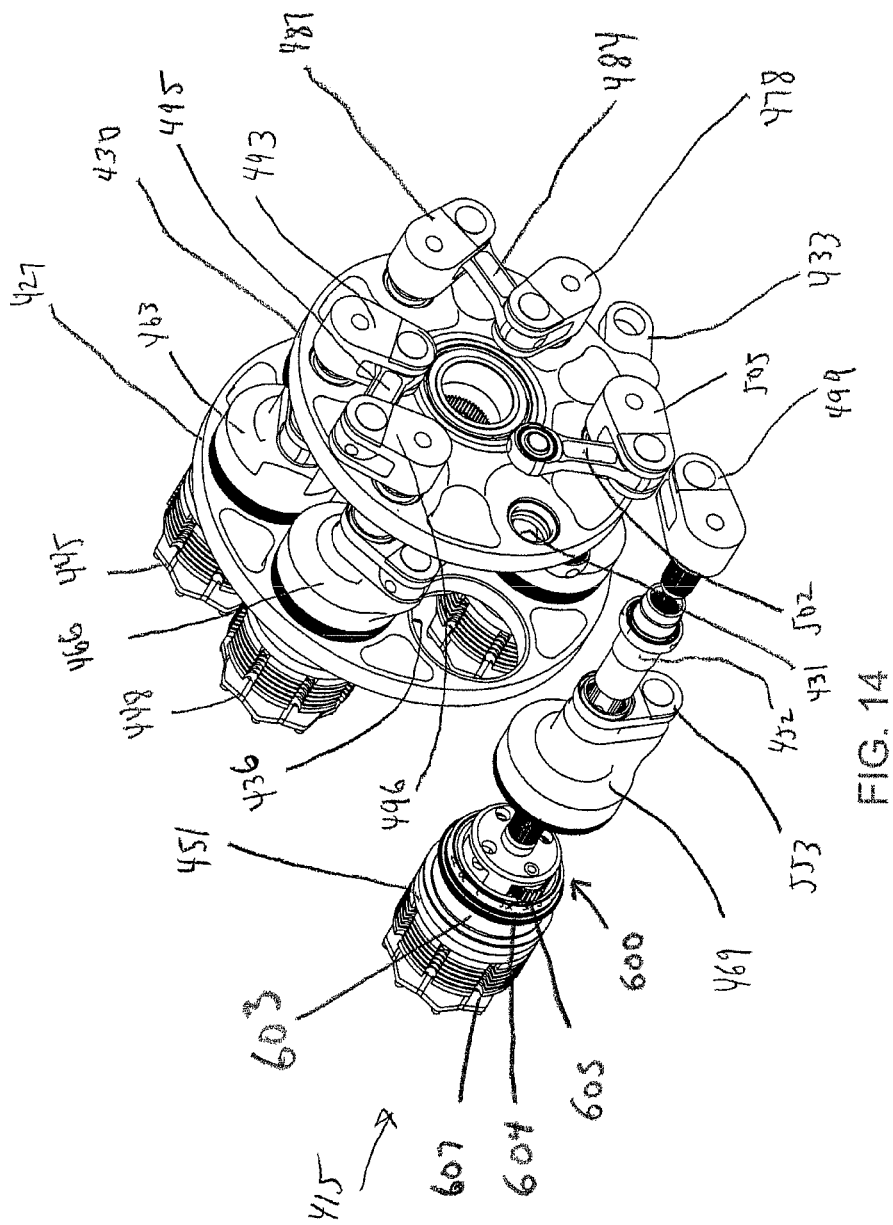
FIG. 14 is a partially exploded front perspective view of the fourth actuator system.
Figure 15:
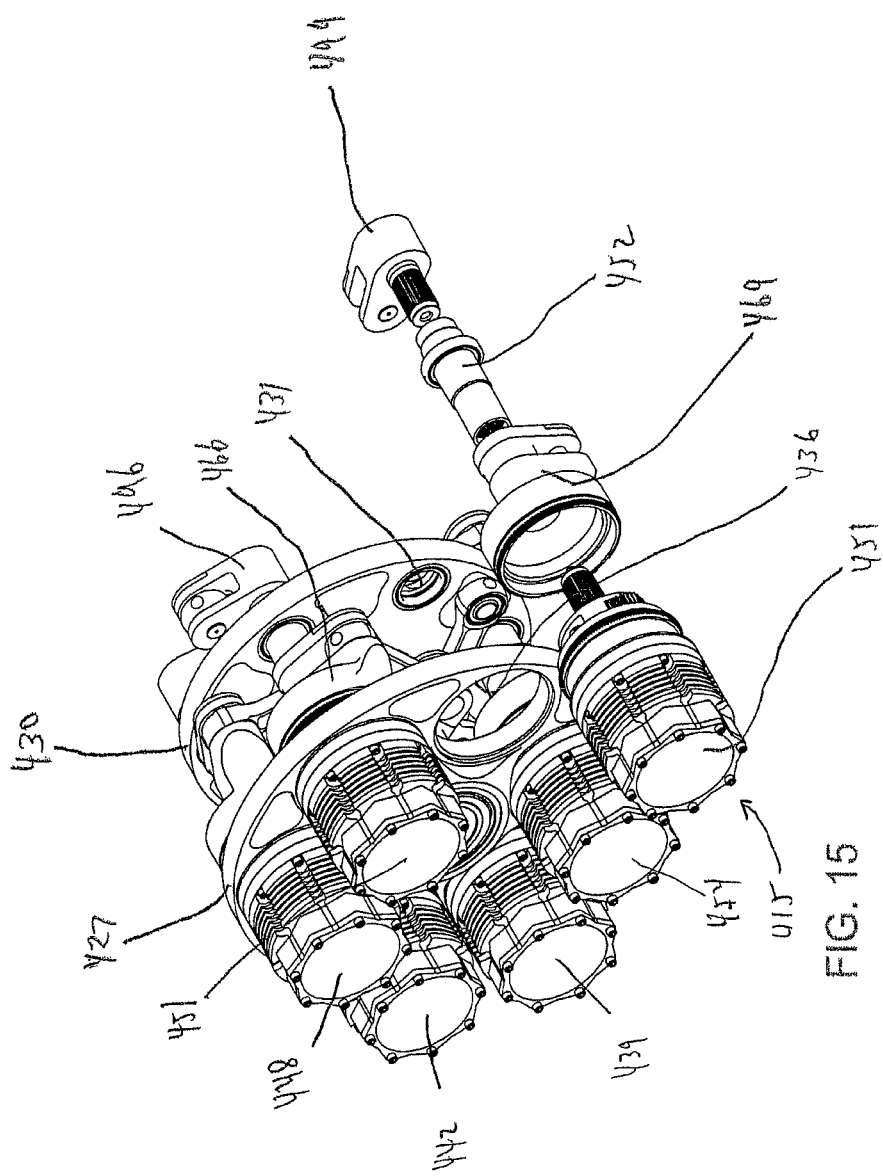
FIG. 15 is a partially exploded rear perspective view of the fourth actuator system.

Turning to FIGS. 14 and 15, exploded perspective views show an actuator 415. The actuator 415 includes a stator 451 which includes a torque tube 452 connected to the moment canceling arm 499. All of the parts of the stator 451 are arranged for rotary motion relative to the reference structures 427, 430 and are configured for relative rotation with its rotor 469. Rotor 469 has a drive arm portion 553 that is connected to the output member 421 as described above in connection with FIG. 12. Moment canceling arm 499 of stator 451 is connected to the moment canceling arm 505 of an adjacent actuator 418 by means of link 502. Arms 499 and 505 are coupled together such that their moment is canceled. The remaining pairs of moment canceling arms 478 and 487 and 493 and 496 are configured the same way to form a network of three actuator units with each unit comprising two actuators connected in the same manner.

Figure 16:
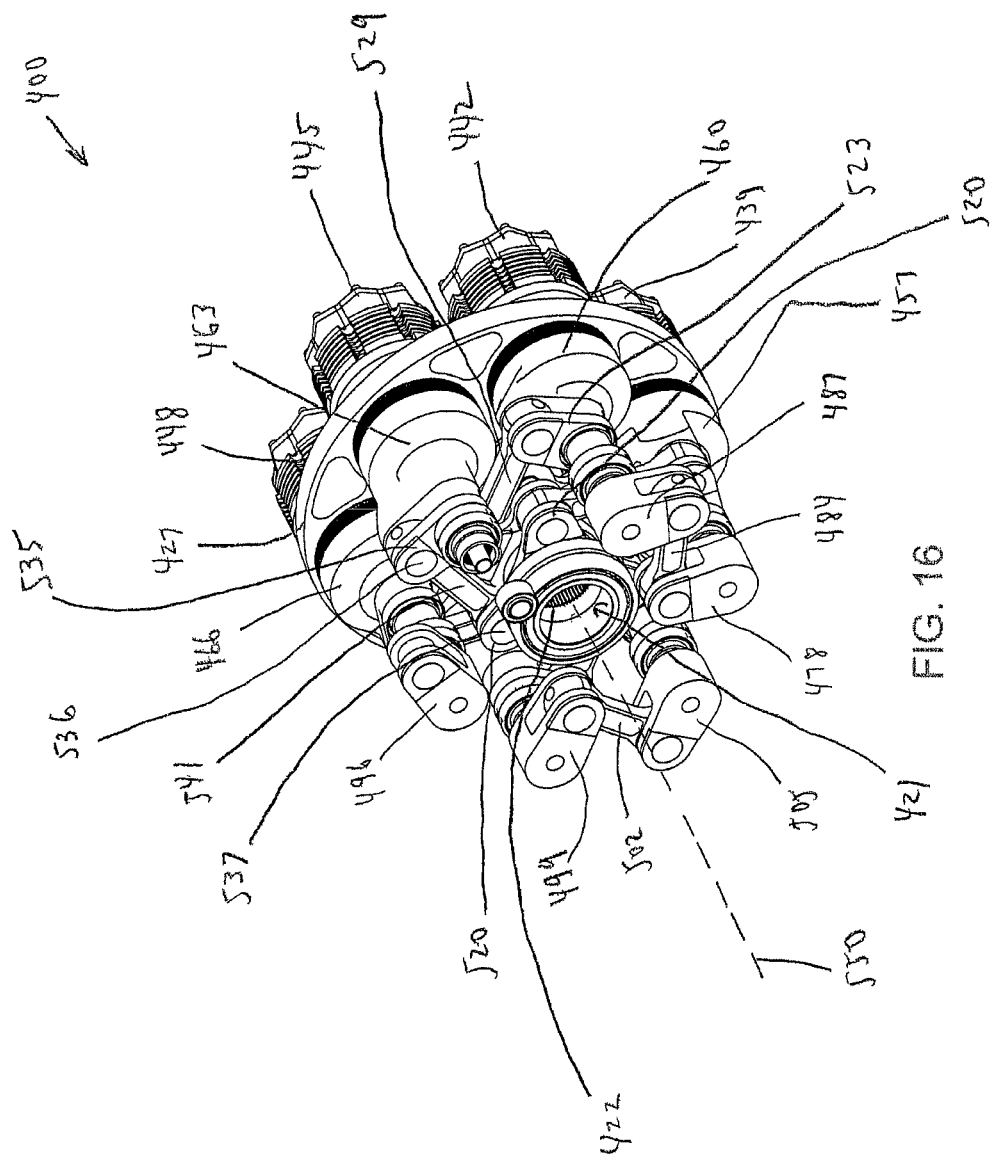
FIG. 16 is a front perspective view of the fourth actuator system with a reference structure removed for clarity.

In FIG. 16, the fourth actuator system 400 is shown with reference structure 430 removed for clarity. At the left side of the figure, the connection of the moment canceling drive arms 499 and 505 by means of link 502 is shown. The link 502 is pivotally attached at a first end to drive arm 499 at pivot point 506 and is pivotally attached to drive arm 505 at the opposite end at pivot point 507.

The output member 421 has a splined bore 422 for receiving a splined shaft 424 (FIG. 8). The output member 421 may be provided with cranks 520 and 532 (FIG. 12) that are coupled to the output member 421 such that forces on the cranks 520 and 532 cause the output member 421 to rotate. Rotor 463 is connected to the crank 520 via a connecting rod or link 541 that is pivotally attached to the drive arm portion 535 of rotor 463 at a first end at pivot point 536 and is pivotally attached to the crank 520 at the opposite end at pivot point 537. The crank 532 is below or to the right in the axial direction with respect to the axis 550 of rotation of the output member 421. The crank 520 may be provided with a generally triangular shape for connection to three of the rotors and crank 532 may also be provided with a generally triangular shape for connection to the three other rotors.

Several modifications can be made to the disclosed embodiments. For example, position sensors, resolvers, and/or encoders may be added to actuators and/or any other linkage joint in order to provide useful feedback to a controller. Additionally, torque sensors, and/or tachometers may additionally be added to each actuator output and/or any other link joint in the linkage system to provide further feedback. In dual tandem configurations, one motor in a pair may be of a different type than its corresponding motor. For example, one motor may be a high torque, high velocity motor, whereas the other motor may be a low velocity, high efficiency, high torque motor. Additionally in configurations in which multiple dual tandem pairs are used, brakes may be safely removed since open actuator failures are not a major concern when a second pair of actuators is available to control the output member in the event of an open failure.

The disclosed embodiments resulted in several significant advantages. The multiply redundant nature of the disclosed configurations provide high fail-safe statistical levels, especially in triplex configurations. Because there is an additional degree of freedom in each actuator pair, a self test may be safely conducted during use in which one actuator moves relative to another actuator without changing the position of the output member. The hexagonal arrangement of the fourth system provides a highly space efficient configuration which allows for arrangement in tightly constrained vehicle frames such as in aircraft airframes.

Several actuator systems have been shown and described, and several modifications and alternatives have been discussed. Therefore, persons skilled in this art will readily appreciate that various additional changes and modifications may be made without departing from the spirit of the invention, as defined and differentiated by the following claims.

The invention claimed is:

1. A method of controlling an actuator system comprising the steps of:
    providing an actuator system comprising:
        a controlled element configured for rotary movement about a first axis relative to a reference structure;
        a linkage system connected to said element and said reference structure;
        a first actuator configured and arranged to power a first degree of freedom of said linkage system;
        a second actuator configured and arranged to power a second degree of freedom of said linkage system, said first degree of freedom and said second degree of freedom being independent degrees of freedom;
        said linkage system having a first link configured for rotary movement about a second axis relative to said reference structure;
        said first axis and said second axis not being coincident;
        said linkage system having a second link configured for rotary movement about a third axis relative to said reference structure;
        said first link and said second link coupled such that rotation of said first link about said second axis in a first direction causes rotation of said second link about said third axis in a second direction;
        said linkage system configured and arranged such that a first angle of rotation between said element and said reference structure may be driven independently of a second angle of rotation between said first link and said reference structure;
    wherein one of said first or second actuators is configured and arranged to drive rotation of said element about said first axis when said other of said first or second actuator is operatively locked; and
    providing power to said first actuator and said second actuator simultaneously such that said controlled element is rotated about said second axis and an angular position of said first link is held constant about said first axis.

2. A method of controlling an actuator system comprising the steps of:
    providing an actuator system comprising:
        a controlled element configured for rotary movement about a first axis relative to a reference structure;
        a linkage system connected to said element and said reference structure;
        a first actuator configured and arranged to power a first degree of freedom of said linkage system;
        a hold device configured and arranged to selectively lock a second degree of freedom of said linkage system, said first degree of freedom and said second degree of freedom being independent degrees of freedom;
        said linkage system having a first link configured for rotary movement about a second axis relative to said reference structure;
        said first axis and said second axis not being coincident;
        said linkage system having a second link configured for rotary movement about a third axis relative to said reference structure;
        said first link and said second link coupled such that rotation of said first link about said second axis in a first direction causes rotation of said second link about said third axis in a second direction;
        said linkage system configured and arranged such that a first angle of rotation between said element and said reference structure may be driven independently of a second angle of rotation between said first link and said reference structure;
    wherein said hold device is configured and arranged to lock said second degree of freedom when said first actuator is operational and to unlock said second degree of freedom when said first actuator is operatively locked; and
    providing power to said first actuator and said hold device simultaneously such that said hold device link locks said second degree of freedom of said linkage system, and said first actuator applies a desired torque to said controlled element.

* * * * *